United States Patent [19]

Legrand

[11] 4,164,018
[45] Aug. 7, 1979

[54] METHOD AND APPARATUS FOR STEERING A SPACECRAFT AND REGULATING ITS ONBOARD SUPPLY VOLTAGE

[75] Inventor: Francis Legrand, Le Chesnay, France

[73] Assignee: Societe Nationale Industrielle Aerospatiale, Paris, France

[21] Appl. No.: 787,653

[22] Filed: Apr. 14, 1977

[30] Foreign Application Priority Data

Apr. 14, 1976 [FR] France ............................. 76 11087
Nov. 12, 1976 [FR] France ............................. 76 34217

[51] Int. Cl.² .......................... G05D 1/00; G05F 7/00
[52] U.S. Cl. ................................. 364/424; 244/166;
310/113; 318/66; 364/453
[58] Field of Search ............ 235/150.2, 150.25, 303.3;
73/178 R; 318/625, 66, 72, 77, 161; 244/165,
166, 173; 310/112, 10, 102 R, 113; 364/453,
459, 454, 424; 361/18, 20

[56] References Cited

U.S. PATENT DOCUMENTS

| 3,010,040 | 11/1961 | Braun .................................. 310/112 |
| 3,350,033 | 10/1967 | Goldberg ............................ 244/165 |
| 3,526,795 | 9/1970 | Pecs .................................... 244/165 |
| 3,591,108 | 7/1971 | Perkel et al. ........................ 244/165 |
| 3,866,025 | 2/1975 | Cavanagh ............................ 364/459 |
| 3,998,409 | 12/1976 | Pistiner ............................... 235/150.2 |

OTHER PUBLICATIONS

Briggs et al.; "Electrical Power Subsystem for the Synchronous Meteorological Satellite (SMS);" Proc. of 7th Intersociety Everly Conversion; Eng. Conf.-San Diego, Calif. (Sep. 25-29, 1972).

Dunlop; "Communications Satellite Power Conditioning Systems"-Power Conditioning Specialists Conference Record; Greenbelt, Md., (Apr. 20-27, 1970).

*Primary Examiner*—Errol A. Krass
*Attorney, Agent, or Firm*—Karl W. Flocks

[57] ABSTRACT

The invention relates generally to a method of regulating the onboard voltage of a spacecraft and of steering the same by at least two contrarotating motor-generator dynamoelectrical machines.

According to said method, there are provided two phases:

the energy storage mode, during which each machine receives electrical energy from solar generators through a velocity controlling generator commanded from a synthesis of the data relating to position and rotor velocity;

the energy restitution mode, during which each generator supplies energy to a load consisting of the onboard equipment of the satellite. Output monitoring systems effect a synthesis of the data relating to position rotor velocity and additionally control the power switches.

According to the same method, there is also provided on board of said spacecraft, electronic equipment which is divided into two main sections, to wit:

electronic control equipment;

electronic processing equipment, itself divided into two parts: control means positioning system and a computing system.

7 Claims, 55 Drawing Figures

METHOD AND APPARATUS FOR STEERING A SPACECRAFT AND REGULATING ITS ONBOARD SUPPLY VOLTAGE

The storage of energy on a spacecraft is rendered necessary by the fact that the solar cells which normally supply the onboard electric current are periodically inoperative when an artificial earth satellite is in a shadow zone.

It is also known that a satellite can be steered by gas jets or by controlling the kinetic moment resulting from the rotation of momentum wheels, or by joint use of the two systems.

When it is required both to store energy in order to be able to restore it in electrical form during periods when the solar cells are inoperative, and to steer a spacecraft by controlling the kinetic moment, there can be provided at least one set of two contrarotating motor-generators, as described in French patent application No. 76 10158 field by the Applicant on Apr. 7, 1976 and published under No. 2347716 but still pending at this date.

In this manner, the solar cells speed the motors up to their maximum rotation speed while the cells are illuminated, whereas the motors operate as generators during the energy restitution phases, their speed being continuously controlled to enable the satellite to be steered.

It is not proposed hereinafter to describe the principle of energy storage by momentum wheel but to describe the theory of operation of dynamo-electric machines capable of performing their functions as motor-generators in the required space environment.

During periods of illumination the energy is stored by the momentum wheels of the machines, which regulate it and at the same time absorb the surplus power from the solar generators. These same momentum wheels can be used for steering the satellite by generating moments which can be as small as desired.

During periods of occulting, the energy is given up by these same machines, which regulate the voltage delivered. They can continue to be used to steer the satellite by furnishing the required kinetic moments, and provide in all cases the necessary gyroscope rigidity.

Such a pattern of operation, however, poses a number of slaving problems which can be summarized as follows: When the machines are functioning as motors during the phase when maximum rotation speed is sought, maintaining a constant kinetic moment requires that the rotation speed differential between the machines be slaved.

According to one method, the speed of the pilot motor increases according to a time-dependent law so determined that the slaved motor follow the speed of the pilot motor with a speed differential which is modulated by the steering function, whereby it is unnecessary to slave the pilot motor to the theoretical law.

In an alternative method, the two motors follow the same speed incrementing law, and their speed differential provides the kinetic moment. In this case each control law is modulated by the steering function.

Both these methods, however, require measuring the actual speeds of the two machines and reacting accordingly, which, owing to their high inertia imposed by the energy to be recovered, implies making extremely accurate measurements if it is desired to be able to apply weak perturbing moments to the satellite.

These methods therefore have the disadvantage of requiring extensive processing prior to actually controlling the machines, which in turn calls for highly complex electronics unless an onboard computer is available.

As will be explained in greater detail hereinafter, the present invention provides a solution well-suited to the problem involved.

When the machines are operating in the generator mode, the only parameter available for controlling their speeds is the current they deliver.

It is therefore necessary to so adjust the outputs from the two machines that the currents delivered determine their respective speeds, the voltage across the load terminals being required to remain constant.

As will be described in greater detail hereinbelow, this invention also provides for a generator meeting the necessary requirements.

The solution proposed by this invention consists in providing two contrarotating dynamo-electric machines forming a momentum wheel, each machine having a permanent-magnet type rotor forming the field magnet and a stator carrying the armature windings. The stator can be of the type with or without iron, since the control law obtained is the same in both cases.

The heavy parts of the machines can thus be disposed on the rotor, their control being effected by a special method of switching the windings that is one of the essential teachings of this invention.

Knowledge of the physical laws governing the behaviour of the machines makes it possible to establish control laws for producing perturbing moments capable of being very weak.

Generally speaking, the different phases of operation of the two machines are such that, in the motor mode and with no steering corrrection, a clock controls the incrementing of their respective speeds in accordance with the pre-established theoretical law.

The commands applied to each machine take account of the speed differential imposed by the last steering correction.

Such operation is made possible by memorization of the commanded speed differential.

Memorization of the commanded speed differential is accomplished by integrating the steering error signal.

With steering correction, control of the machines takes account both of the pre-established theoretical law and of the instantaneous speed differential commanded by the steering function.

A steering moment is applied by accelerating one or the other of the motors, depending on the sense in which the moment is to be applied.

In the generator mode and with no steering correction, a clock controls decreases in the speeds of the generators, in accordance with the pre-established theoretical laws.

The clock frequency is slaved by the output voltage in such manner as to maintain the latter constant irrespective of load variations.

The control inputs to the two machines take account of the speed differential commanded by the last steering correction.

This operation is made possible by memorizing the commanded speed differential, and the memorizing operation is accomplished in the same way as for operation in the motor mode.

With steering correction, control inputs to the machines allow both for the pre-established theoretical law and for the instantaneous speed differential commanded by the steering function.

A steering moment is applied by reducing the current delivered by one machine and increasing that delivered by the other machine, this being done by dividing the commanded speed differential corrections equally between the two machines.

The sense of the moment applied is determined by which of the machines is chosen for the current increase and decrease operations respectively.

With such an operating mode, a system devised thus offers a number of advantages:

since the perturbing moments are very weak, the steering function makes only infrequent corrections;

since the system is autonomous, a temporary failure of the steering function will not compromise the mission, and this is true both of the energy accumulation and restitution functions and of the moments applied to the satellite;

similarly, because the speed differential is memorized in the control electronics, the steering function does not have to make continuous corrections;

lastly, the design of the control electronics will not necessitate revising the electronics should the amount of energy to be stored be different, for in that case only the information stored in the read-only memories and the size of the power switches would need to be revised.

The description which follows will enlarge in greater detail on the general concept of the invention and will give, by way of possible forms of embodiment, the means for implementing a system of two contrarotating wheels having the following leading particulars:

| | |
|---|---|
| Energy stored per unit installation weight | 35 Wh/kg |
| Number of charging and discharging cycles | Theoretically unlimited |
| Discharge efficiency for an onboard voltage of 50V | 83% |
| Power required for electronics | 23W |
| Losses in a machine operating in motor mode | 20W |
| Losses in machine operating in generator mode | 30W |
| Modulation depth | 76% |
| Nominal voltage of machine | 47V |
| Nominal speed of machine | 14,400 rpm |
| Maximum operating speed | 42,600 rpm |
| Minimum operation speed | 18,000 rpm |
| Inertia of a machine rotor | 0.4 kg m$^2$ |
| Differential kinetic moment created by the machines | 100 Nms |
| Variation in differential kinetic moment | ±25% |
| Maximum applicable torque $\Delta\phi$ | $0.036 \leq Nm \leq 0.18$ |
| Speed correction setting | 10 bits + 1 sign bit |
| Protection against overloads | Provided |
| Perturbing moment in motor mode at nominal load | $2 \times 10^{-4}$ Nm |
| Perturbing moment in generator mode at nominal discharge | $3 \times 10^{-4}$ Nm |
| Perturbing moment in generator mode with 25% load variation | $3 \times 10^{-3}$ Nm |
| Energy recoverable with a system of two contrarotating machines | 4.3 MJ |
| Voltage regulation during recovery phase with ±30% load variation | ±1% |

There will lastly be described the electronics section required for operation of the machines, this electronics section being divided, in accordance with a teaching of the present invention, into electronic control equipment and electronic processing equipment, which processing equipment in turn comprises a control-means positioning system and a computing system.

For greater clarity in the description which follows, the following notation system will be adopted to designate the various parameters involved in the subject method of this invention for steering a spacecraft and regulating its onboard voltage:

$\omega_1$, $\omega_2$ to designate the respective angular velocities of the two machines;

$\omega TH$ to designate the mean theoretical velocity of the machines;

$\Delta\omega_1$, $\Delta\omega_2$ to designate the respective velocity differentials of the machines relative to the $\omega TH$;

$\omega T_1$, $\omega T_2$ to designate the respective theoretical velocities of the two machines;

$\Delta\omega_C$ to designate the velocity differential demanded by the satellite in order to generate the moment.

On the basis of this notation it is possible to determine the procedure for carrying the invention into practice, to wit:

During the motor phase the requirement is for maximum angular velocity.

(a) To apply the control inputs to the motors

Take account both of the theoretical law $\omega TH$ of rise in velocity and of the instantaneous velocity differentials $\Delta\omega_1$, $\Delta\omega_2$ commanded by the steering function by generating:

$$\omega_1 = \omega TH + \Delta\omega_1 \text{ and } \omega_2 = \omega TH - \Delta\omega_2$$

(b) Memorize the velocity differentials $\Delta\omega_1$, $\Delta\omega_2$ by integrating the error signal from the steering function.

(c) In order to apply to the machines control inputs that take account of the $\Delta\omega_c$, generate:

A moment SH (clockwise)

| | |
|---|---|
| Wheel of machine 1 | $t_1 : \Delta\omega_1$ |
| | $t_2 : \Delta\omega_1 = \Delta\omega_1 + \Delta\omega_c$ |
| Wheel of machine 2 | $t_1 : \Delta\omega_2$ |
| | $t_2 : \Delta\omega_2 = \Delta\omega_2$ |

Moment SAH (counter-clockwise)

| | |
|---|---|
| Wheel of machine 1 | $t_1 : \Delta\omega_1$ |
| | $t_2 : \Delta\omega_1 = \Delta\omega_1$ |
| Wheel of machine 2 | $t_1 : \Delta\omega_2$ |
| | $t_2 : \Delta\omega_2 = \Delta\omega_2 - \Delta\omega_c$ |

(d) In order to synchronize the control input with the angular velocity of the machine, use the clock frequency Fr synchronized with the angular velocities $\omega_1$, $\omega_2$ of the machines.

During the generator phase:

(a) In order to apply control inputs to the generators:

Take account both of the theoretical law $\omega$TH and of the instantaneous velocity differentials $\Delta\omega_1$, $\Delta\omega_2$ commanded by the steering function by generating:

$$\omega_1 = \omega TH + \Delta\omega_1 \text{ and } \omega_2 = \omega TH - \Delta\omega_2$$

(b) Memorize the commanded velocity differentials $\Delta\omega_1$, $\Delta\omega_2$ by integrating the error signal from the steering function.

(c) In order to apply to the machines control inputs that take account of $\Delta\omega_c$, generate:

A moment SH (clockwise)

| Wheel of machine 1 | $t_1 : \Delta\omega_1$ |
|---|---|
| | $t_2 : \Delta\omega_1 = \Delta\omega_1 + \frac{\Delta\omega_c}{2}$ |
| Wheel of machine 2 | $t_1 : \Delta\omega_2$ |
| | $t_2 : \Delta\omega_2 = \Delta\omega_2 + \frac{\Delta\omega_c}{2}$ |

A moment SAH (counter-clockwise)

| Wheel of machine 1 | $t_1 : \Delta\omega_1$ |
|---|---|
| | $t_2 : \Delta\omega_1 = \Delta\omega_1 - \frac{\Delta\omega_c}{2}$ |
| Wheel of machine 2 | $t_1 : \Delta\omega_1$ |
| | $t_2 : \Delta\omega_2 = \Delta\omega_2 - \frac{\Delta\omega_c}{2}$ |

(d) In order to synchronize the control inputs with the angular velocity of the machine, use the clock frequency Fr synchronized with the angular velocities $\omega_1$, $\omega_2$ of the machines.

(e) Continuously slave the clock frequency nFo/N controlling the law of decrease in velocity to the busbar voltage.

The description which follows with reference to the accompanying non-limitative exemplary drawings will give a clear understanding of how the invention can be carried into practice.

Starting with general considerations, the theory of operation of the machines must first take account of a certain number of parameters.

Thus, in the event of application of the system for storing energy on a satellite of the geostationary type, it should be noted that the eclipse time varies in the course of a year.

Further, the rotation speeds of the machines at the end of the charging period must remain within certain limits since their maximum speed is limited by their mechanical characteristics and the minimum speed by the energy recovered. But at the same time the steering function introduces corrections into the system which could cause the rotation speeds of the machines to drift towards limit values.

The different possible charging and discharging cycles of such a system are thus capable of varying constantly, and the slaving function must permit of generating the data concerning theoretical velocity, position of contol means and limitation against overcurrents in the energy storage and energy restitution cycles.

Figure 2:
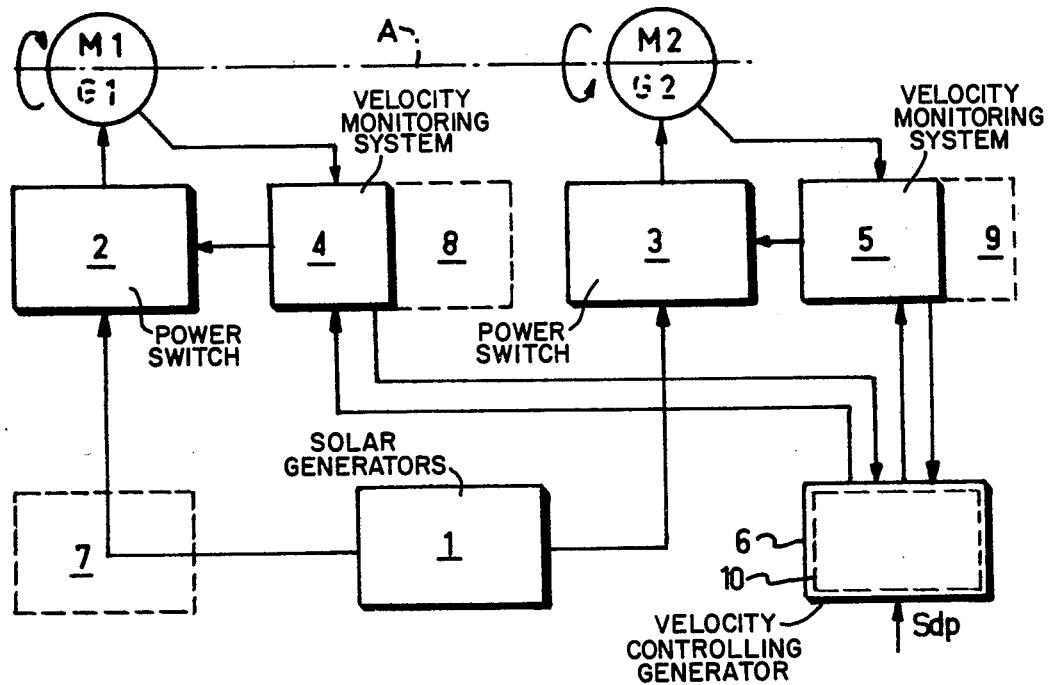
FIG. 2 is a block diagram showing the slaved operation of two contrarotating machines during the energy storage phase.
Figure 15:
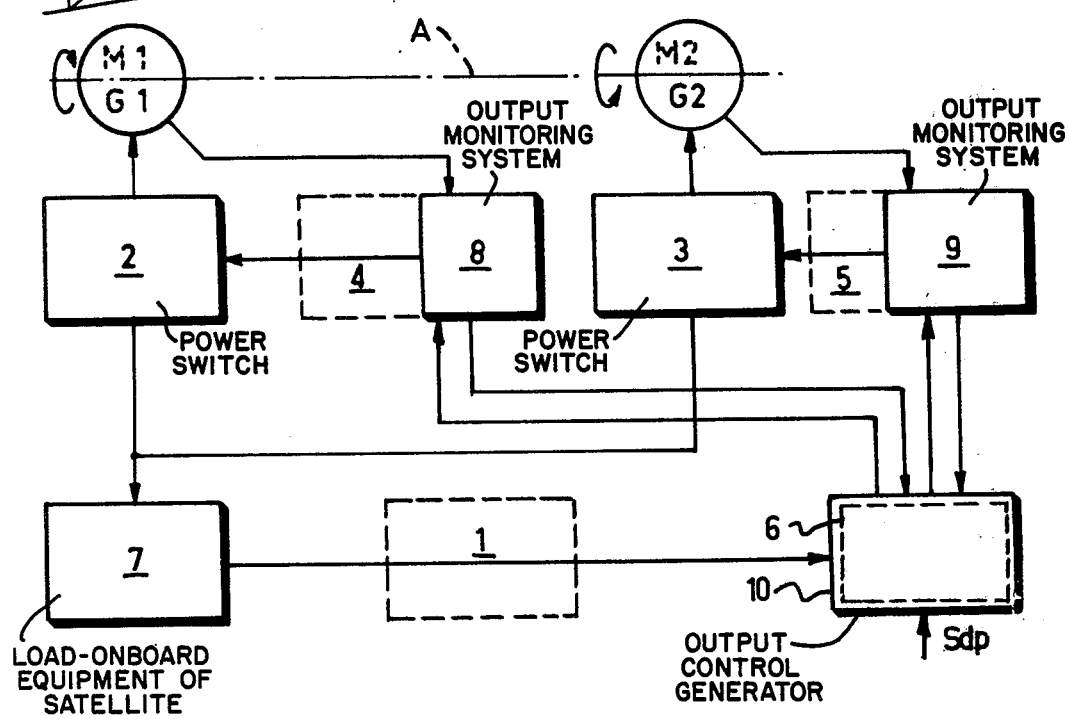
FIG. 15 is a block diagram showing the slaved operation of two contrarotating machines during the energy restitution phase.

Referring now to FIGS. 2 and 15, which are block diagrams of the energy storage and restitution system with steering capability according to this invention, during the energy storage mode and during the energy restitution mode, respectively, it will be seen that the machines are identical and that they function as motors M1, M2 in the former mode or as generators G1, G2 in the latter case, and that they rotate in opposite directions about a common axis A.

For greater clarity, there is represented on FIG. 2 in solid lines those components which are used in the energy storage function and in broken lines those components which are not used during that phase, and on FIG. 15 in solid lines those components which are used in the energy restitution function and in broken lines those components which are not used during that phase.

In the energy storage mode according to FIG. 2, each machine M1 (or M2) receives electrical energy from solar generators 1 through power switches 2 and 3 which, at determinate moments in time, switch the source to the stator windings of the machines.

Velocity monitoring systems 4 and 5 control the power switches, and such control is based on a synthesis of the data relating to position, rotor velocity, and commands from a velocity controlling generator 6.

Generator 6 issues commands which impose functional angular velocities on the motors, which commands are obtained after processing of the data relating to the misalignment signal Sdp, the rotor velocity and the law of rise in velocity. In the energy restitution mode according to FIG. 15, each generator G1 (or G2) supplies energy to a load 7 consisting of the onboard equipment of the satellite. The power switches 2 and 3 are the same as those used in the energy storage function and are effective in switching the energy source 1 to the windings at any desired moment in time.

Output monitoring systems 8 and 9 effect a synthesis of the data relating to position, rotor velocity, and commands from the output control generator, and they additionally control the power switches.

The output control generator 10 delivers the commands that determine the output from the each generator. Such commands are obtained subsequent to processing of the data concerning the misalignment signal Sdp, the voltage across the load terminals, the rotor velocity, and the law for energy restitution at constant torque. It should be noted that the voltage across the load terminals is maintained constant regardless of the variations in output imposed by the load.

The energy storage mode requires that the formula giving the motor control law be demonstrated.

Figure 1:
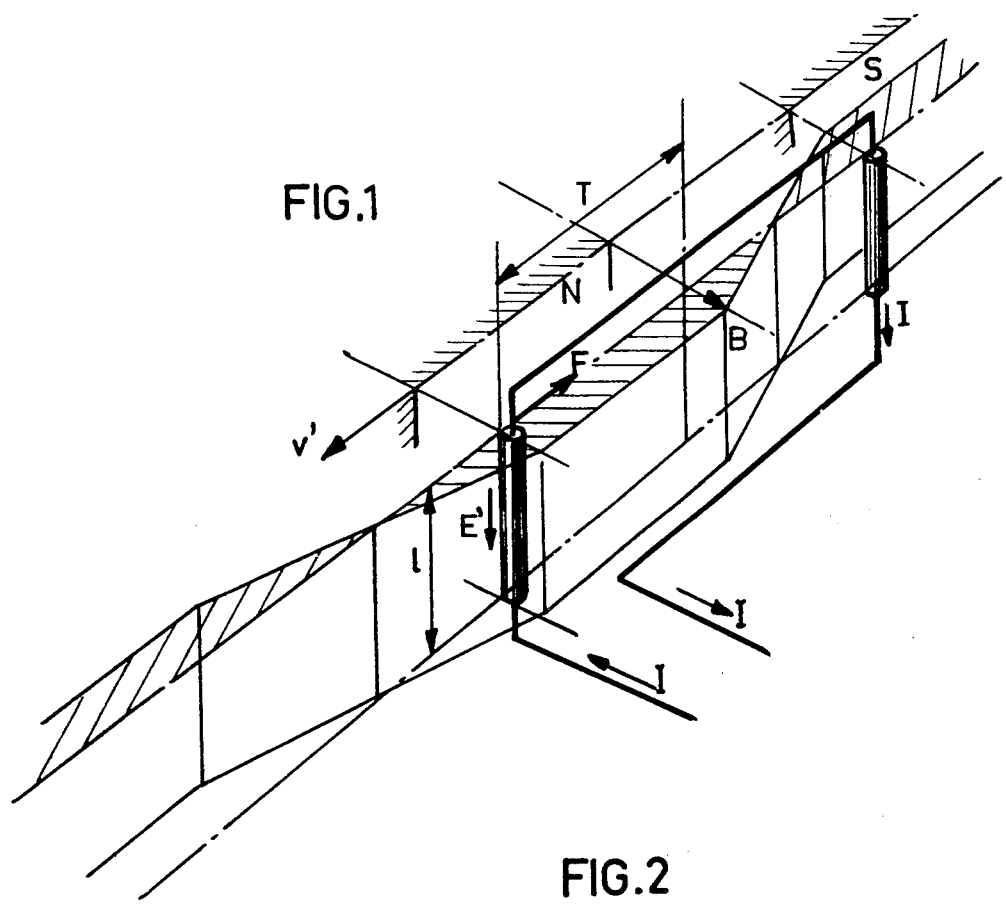
FIG. 1 is a schematic representation of the basic phenomenon governing the law of control, in the motor mode, of a machine according to this invention.

Referring to FIG. 1, it can be demonstrated on the basis of the fundamental laws of electrical engineering, viz.

| electromagnetic force | $F = B \times I \times l$ |
|---|---|
| | newton tesla amp. m |
| and electromotive force | $E' = B \times l \times v = U \times R \times I$ |
| | volts tesla m m/sec V Ω amp. | that, in the motor mode, the engendered velocity v of motion of a conductor through the magnetic field, or velocity v' of motion of the field magnet furnishing that magnetic field, which is equal and directly opposed to it, is higher when the induction B becomes smaller, by taking E' to be equal to U which is equal to a constant by reason of the fact that the product $R \times I$ can be neglected in this case.

When the instant at which the circuit is opened for a duration T, is advanced before passage of the conductor beneath the field magnet, the flux intercepted by the conductor is thus weaker than that intercepted directly beneath the field magnet, by reason of the spacing of the field magnets and the reversed polarities of the magnetic fields.

Therefore the mean velocity v' of the field magnet increases if the switching is advanced, while the circuit breaking time T remains unchanged.

By suitably adjusting the instant of switching of the conductors experiencing passage of the field magnets, it is thus possible to increase and to monitor the speed of such passage provided that the opposing torque is very low, which is in fact the situation in question, as will be explained hereinafter (presence of magnetic bearings).

Figure 3:
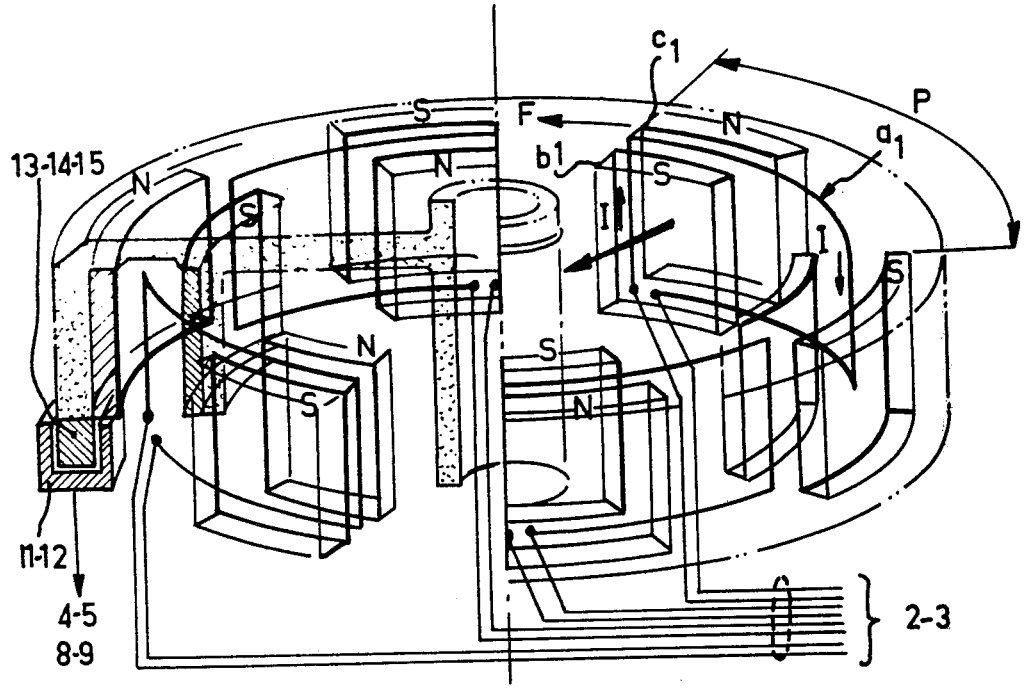
FIG. 3 is a schematic illustration in partial perspective of the positioning of the armatures and field magnets of a machine according to the invention.

Referring now to FIG. 3, which schematically illustrates the construction of a motor-generator according to the invention, having six permanent-magnet type rotating field magnets and four armature-forming fixed turns of magnetic pitch P, it will be seen that if a current I is caused to flow through the turn $a^1$, starting in the position shown in the figure, the Laplace forces produced in the strands will cause field magnets $b^1$ and $c^1$ to revolve in the direction F provided that they are capable of revolving together about the axis.

Figure 4:
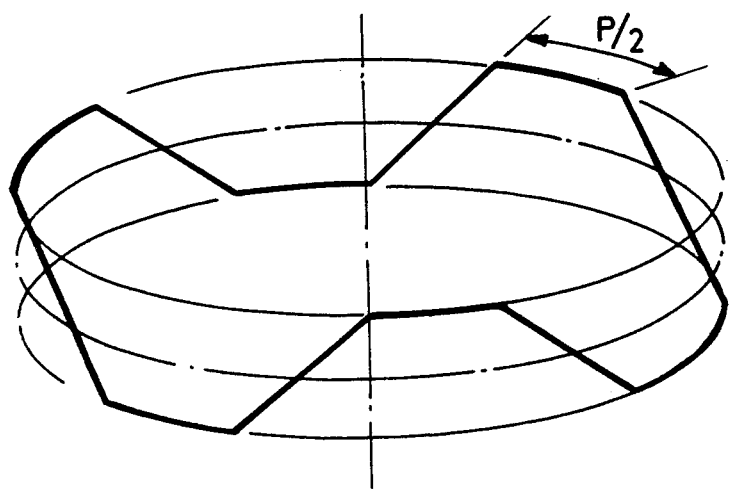
FIG. 4 is a schematic representation of the distribution of the magnetic induction in the machine of FIG. 3.
Figure 6:
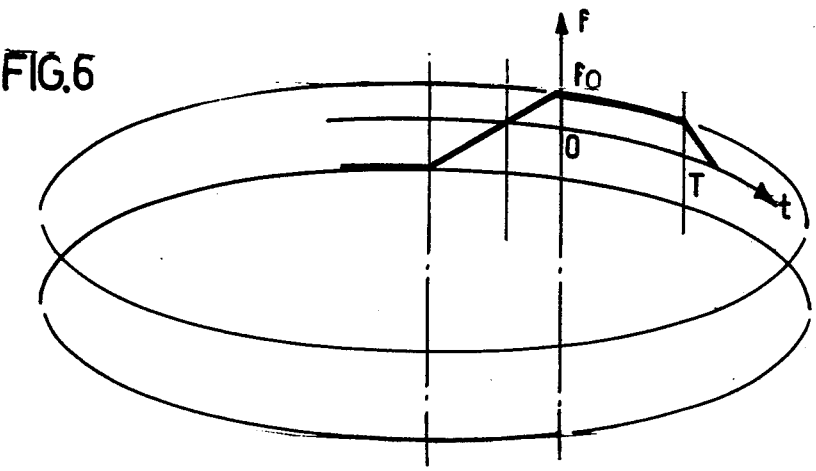
FIGS. 6 and 7 are partial schematic illustrations of the distribution of the flux of a field magnet according to FIG. 5, and portraying the switching process according to this invention.
Figure 7:
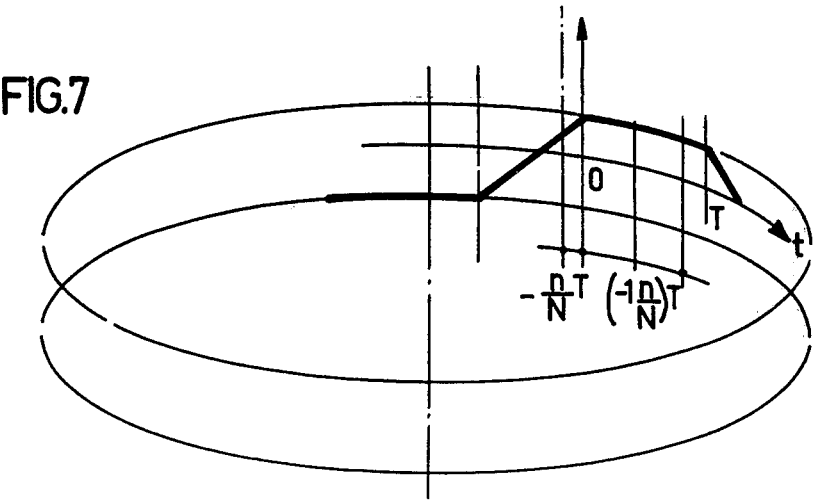

If the distribution of the induction is considered to be trapezoidal, as shown in FIG. 4, and the current is substantially constant, and if the start of passage of the current is advanced as shown in detail in FIGS. 5, 6 and 7, then the force may be expressed as follows in the augmenting zone:

$$f = (+2f_o/T)t + f_o$$

$$f_{mean} = f_o(1 - \frac{n}{N}) + \frac{n}{2N}\left(f_o + 2f_o(-\frac{n}{N}) + f_o\right)$$

$$= f_o(1 - \frac{n^2}{N^2})$$

where T is the nominal time of passage of the current, N the number of possible positions during the time T, and n the number of positions chosen for the control means, the lead taken over the nominal moment in time of opening of the switches being consecutively (n/N)T.

It is then possible to demonstrate the torque from the expression:

$$\varphi = FR = BIIN^b R = K_o I$$

where $N^b$ is the number of conductors and R the radius of the rotor.

However, in the case under consideration, $$\varphi = FR = BIIN^b \left(1 - (\tfrac{n}{N})^2 R\right) = KI \quad (1)$$

where $K = K_o \left(1 - (\tfrac{n}{N})^2\right)$

The expression for the angular velocity can still be established for, if RI is small, it can be considered that:

$$\begin{aligned}\varphi\omega &\simeq UI \\ KI\omega &= UI \\ \omega &= \tfrac{U}{K}\end{aligned} \quad (2)$$

but $$\omega_o = \tfrac{U}{K_o}$$

whence $$\omega = \frac{\omega_o}{1 - (\tfrac{n}{N})^2}$$

Figure 8:
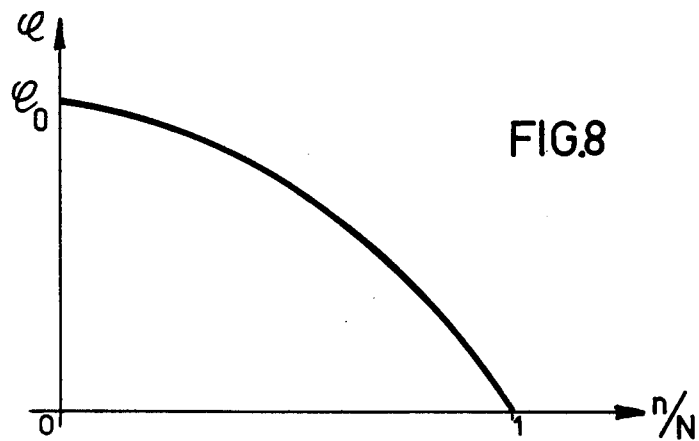
FIG. 8 is a graph in which the torque is plotted against the position of the switch control.
Figure 9:
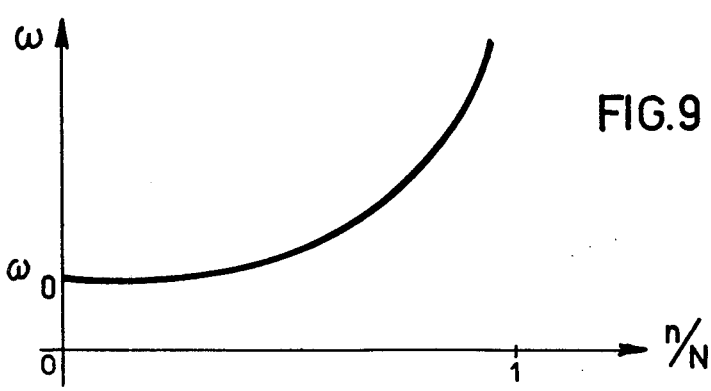
FIG. 9 is a graph in which angular velocity is plotted against switch control position.

It should be noted that $\omega$ and $\varphi$ vary as a function of n/N, as shown by the curves in FIGS. 8 and 9.

It will be noted also on these two figures that, when n/N tends towards unity, the torque tends towards zero, whereas the velocity tends towards infinity.

This in turn leads to making certain observations concerning the limitations of the previously expounded laws. For these laws were established on the assumption that the current remained constant during a switching 'window', which is not entirely true. Further, the current increases with $\omega$, and consequently the voltage drop RI is no longer negligible compared to U when $\omega$ becomes very large. Therefore the variation in current absorbed as a function of angular velocity can no longer be neglected.

When the velocity is stabilized, the driving torque is equal to the opposing torque.

$$\varphi_r = \phi_m = KI$$

Given a constant opposing torque, then KI must be equal to $K_o I_o$.

But $\omega = (K_o/K)\omega_o$ hence $I = (\omega/\omega_o)I_o$

This simplified calculation is intended to show that the solution provided by the aforementioned expression (2) can indeed be considered only in cases where the opposing torque is very low, which is in fact the situation encountered with the present invention, which utilizes magnetic bearings of the kind described in French patent application No. 74 00190 filed by the Applicant on Jan. 3, 1974.

With regard to the instantaneous counter-electromotive force, this is known to evolve in the same way as the instantaneous force. Now, the electromotive force induced in a conductor is given by the formula:

$$e = Blv$$

where $v = R\omega$

Figure 11:
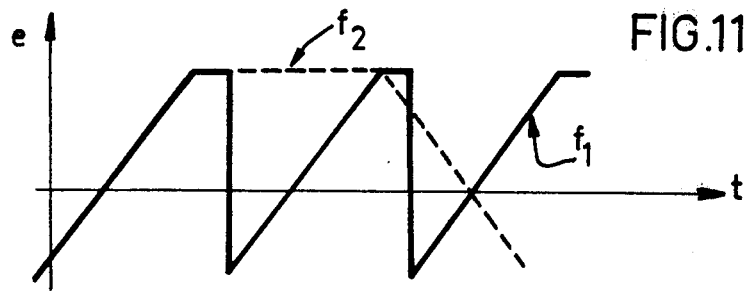
FIG. 11 is a graph showing the instantaneous changes in the total counter-electromotive force in the motor mode.
Figure 12:
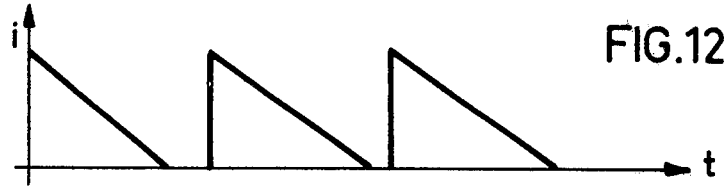
FIG. 12 is a graph showing the instantaneous current variations in a motor devoid of inductance.
Figure 13:
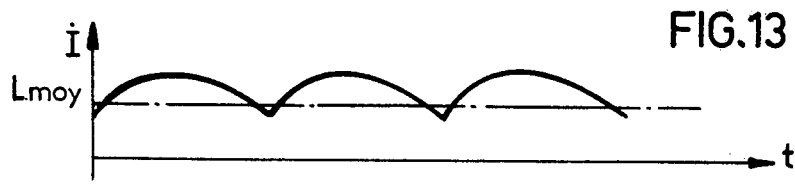
FIG. 13 is a graph showing the actual instantaneous variation in current in the motor mode, i.e. one possessing inductance.

As shown in FIGS. 11, 12 and 13, the total counter-electromotive force $f_1$ of the motor, shown in solid lines in FIG. 11 (the counter-electromotive force $f_2$ in a coil being shown in broken lines thereon), consequently varies greatly through time when the control is greatly advanced.

The current, which is given by the formula $$i = (e - U)/R$$

would consequently assume very large values when the counter-electromotive force is negative, making it impossible for the motor to function satisfactorily.

In order to overcome this drawback, use is made of the self-induction of each winding and an external inductance coil is provided to smooth the current and thereby obtain a low ripple ratio.

Under these conditions, the counter-electromotive force experienced by the generator feeding the motor is for all practical purposes a DC voltage as in the case of a conventional motor.

Determining this inductor by using the first-overtone method enables the maximum ripple ratio of the counter-electromotive force to be obtained.

After expanded calculations (not performed here), the following expression is arrived at:

$$L = \tfrac{\gamma}{\pi^2 \alpha} K_o \tfrac{1}{IM_1} \quad (3)$$

where $$\gamma = \sqrt{\left(\cos 2\pi(1 - \tfrac{n}{N}) - 1\right)^2 + \left(2\pi \tfrac{n}{N} + \sin \tfrac{2\pi n}{N}\right)^2}$$

$$K_o = BIN^b R$$

and $\alpha$ = number of switchings per revolution.

Operation of the motor can be viewed in succession through the medium of a lattice of curves stemming from the relation:

$$\varphi = kI = K\left(\tfrac{U - E'}{R}\right) \quad (4)$$

$$\varphi = \tfrac{Ku}{R} - \tfrac{K^2 \omega}{R}$$

according to which the torque is given as a function of angular velocity, taking K as a parameter.

Figure 10:
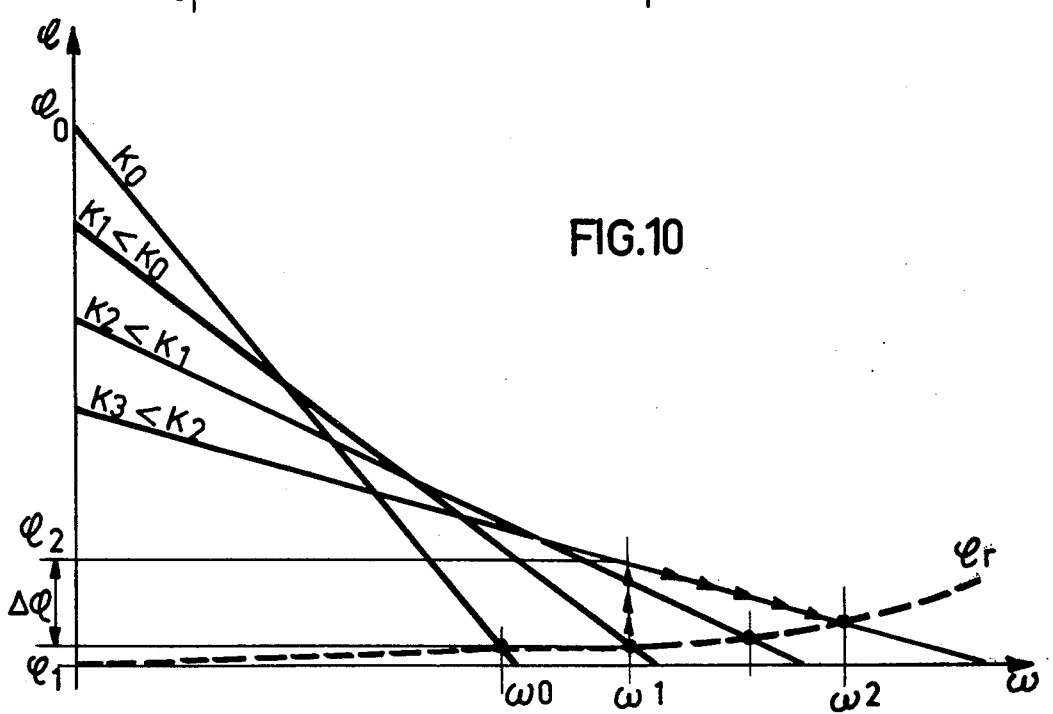
FIG. 10 is a diagram for determining the actual velocity in the motor mode.

As shown in FIG. 10, relation (2) above gives the maximum velocity attainable by the motor, this velocity being obtained when the opposing torque $\varphi r$ is zero.

The true angular velocity of the motor is defined by the point of intersection of the curve of opposing torque with the straight line given by relation (4) above.

The curves in FIG. 10 are thus in fact borne out by the previously made demonstration.

Response of the momentum wheel to a motor drive input can readily be interpreted from the lattice of curves in FIG. 10.

For if $\Delta\varphi = \varphi_2 - \varphi_1$, and of $\omega_1$ remains unchanged, then by using relation (4) above one obtains $$\omega_1 = \frac{K_1 U/r - \varphi\, r}{K_1^2/r} \text{ since } \varphi_1 = \varphi_r.$$

After expansion one obtains the following final relation:

$$\Delta\varphi = \frac{K_2 U}{r} 1 - \frac{K_2}{K_1} \tag{5}$$

The velocity $\omega_1$ will tend towards $\omega_2$ along the arrowed path in FIG. 10.

The energy restitution phase similarly requires that the formula for the law of control of the generator be demonstrated.

Figure 14:
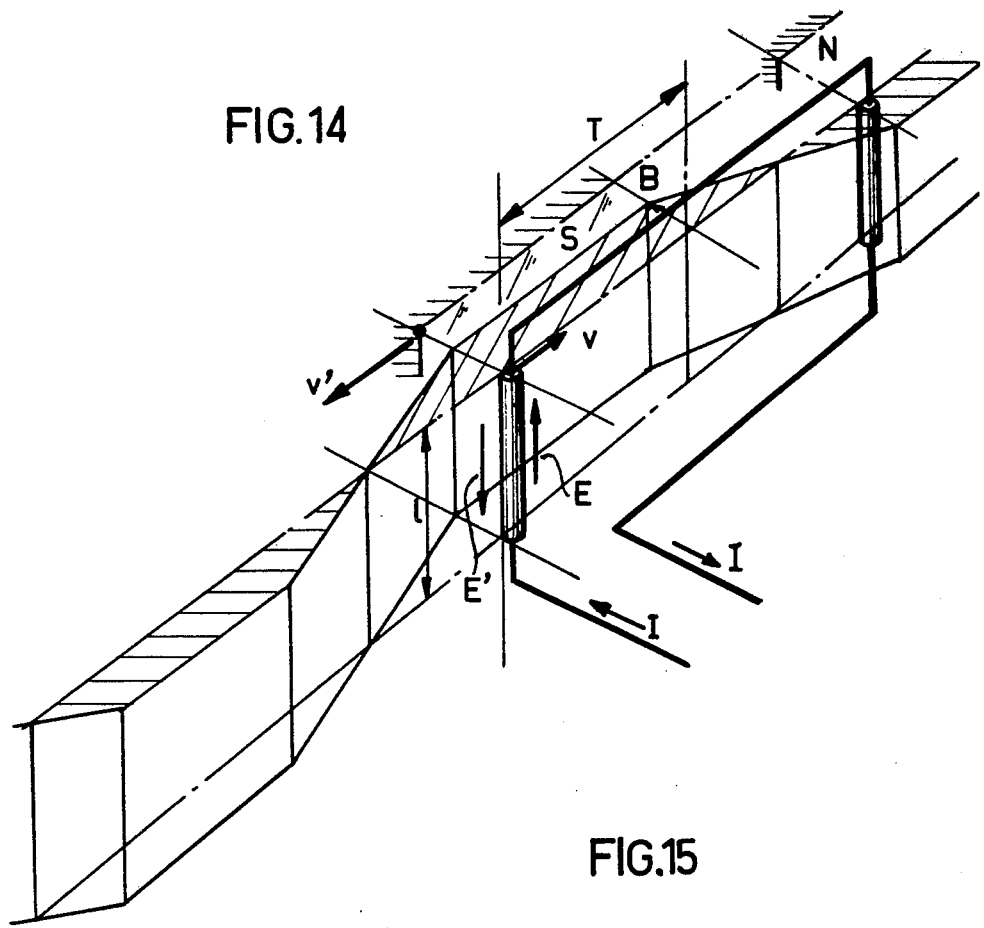
FIG. 14 is a diagrammatic illustration of the basic process governing the law of control in the generator mode of a machine according to the invention.

By referring to the diagram in FIG. 14, it can be shown from the basic laws of electrical engineering, viz.:

$$\text{electromotive force} = \frac{E}{\text{volt}} = \frac{B}{\text{tesla}} \frac{l}{m} \frac{v}{m/\text{sec}}.$$

that in the generator function the electromotive force supplied to the load R is proportional to the length of the conductor intercepting the magnetic induction flux B and to the velocity v with which the conductor moves through the magnetic field or to the equal and opposite velocity v' with which moves the field magnet furnishing that magnetic field.

The law governing such intercepted flux likewise teaches that the value of the electromotive force induced during the time T is given by $$E = \Phi/t$$

where $\Phi$ represents the flux which is swept or intercepted by the conductor for a time t.

It is consequently possible to modulate the electromotive force, and hence the intensity, by adjusting the duration of opening of the switches.

Such method offers the dual advantages of improving the efficiency of the installation by dispensing with a DC/DC converter and of simplifying the electronic circuitry by using the same power switches as those used for the motor function.

The instantaneous electromotive force produced is of a trapezoidal pattern by reason of the alternating distribution of the field magnets, which are in fact the same as those used in the motor function, as shown in FIGS. 3 to 7. However, its maximum value may greatly exceed the power supply voltage to an extent of as much as $$E_{max}/U \simeq 3,$$

such increase in the electromotive force resulting from the big increase in angular velocity achieved during operation in the motor mode, whereby it may prove impossible to suddenly switch a high voltage to a load requiring a lower voltage, without engendering significant losses.

Here again the inductance of the generator and an external inductor will play a regulating role.

It should be noted that the electrical size of such coil is virtually the same as that required for operation in the motor mode, as emerges from calculations which it is not proposed to demonstrate herein.

Further, in order not to cause an overvoltage and losses upon opening of the switch, the same is latched once the current has cancelled itself naturally.

Figure 16:
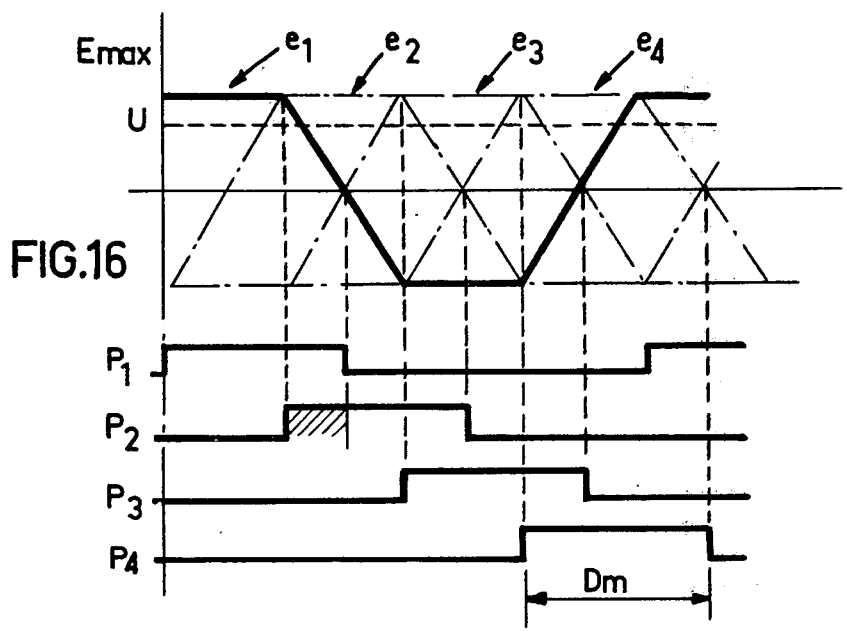
FIG. 16 is a diagram showing the positions of the four energy tapping gates and their respective durations, with respect to the instantaneous electromotive forces presented on the coils.

FIG. 16 shows the arrangement for four energy tapping gates $P_1$, $P_2$, $P_3$ and $P_4$ and their respective maximum durations $D_m$, with respect to instantaneous electromotive forces $e_1$, $e_2$, $e_3$ and $e_4$ present on the machine coils. It is to be noted also that the switch is latched when the electromotive force is zero, thereby ensuring that the current in the driven coil is zero at that moment.

The overlapping of the energy tapping gates, corresponding to the hatched portion of FIG. 16 is not a disadvantage since the switches never open fully and since they close before the end of the gate, the effect of which is to prevent simultaneous control inputs to the switches.

Figure 17:
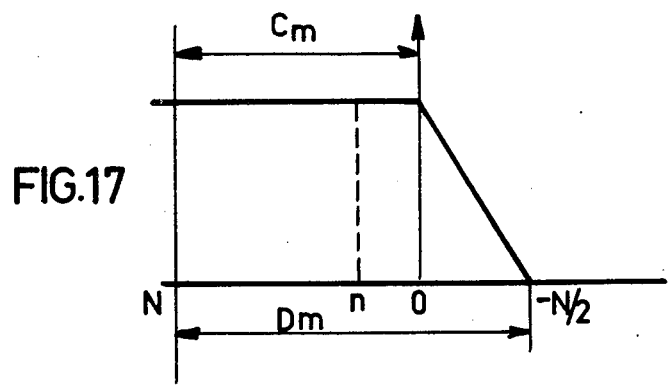
FIG. 17 is a diagram representing the maximum travel for positioning the control.
Figure 18:
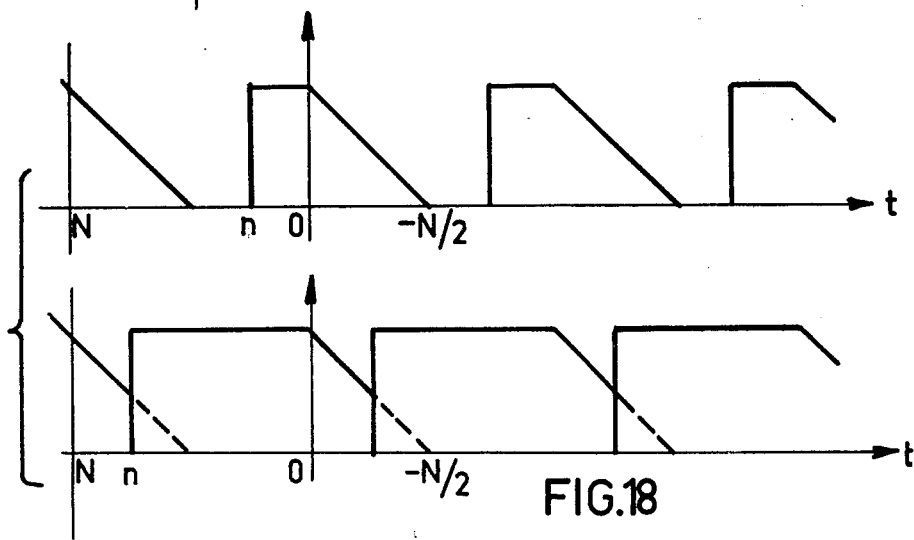
FIG. 18 is a diagram showing the output electromotive forces obtainable from the machine without a filtering operation.

FIGS. 17 and 18 show the maximum travel $C_m$ for positioning of the control means, and the electromotive force obtained before filtering.

FIG. 17 provides an understanding of the manner of calculating the mean electromotive force ($E_{mean}$) which, taking a first case in which $n \leq N/2$, is given by $$E_{mean} = \frac{1}{N}\left(nE + \frac{1}{2}\frac{N}{2}E\right) = E\left(\frac{1}{4} + \frac{n}{N}\right)$$

and, in another case wherein $n \geq N/2$, is given by $$E_{mean} = E\frac{n}{N}\left(2 - \frac{n}{N}\right)$$

When velocity is maximum, i.e. at the start of operation in the generator mode, the control input to be applied always gives $n > 0$, making it possible to operate in the area specified in FIG. 17.

Since the electromotive force is given by the relation $$E = E_o(\omega/\omega_o)$$

where
$E_o$ = the no-load electromotive force of the generator rotating at an angular velocity $\omega_o$
$\omega_o$ = nominal angular velocity of the generator
$\omega$ = actual angular velocity of the generator, it is therefore possible to determine the two fundamental laws for operation in the generator mode:

$$n \leq N/2, E_{mean} = E_o\frac{\omega}{\omega_o}\left(\frac{1}{4} + \frac{n}{N}\right) \tag{6}$$

$$n \geq N/2, E_{mean} = E_o\frac{\omega}{\omega_o}\frac{n}{N}\left(2 - \frac{n}{N}\right) \tag{7}$$

Knowing that $K_o = E_o/\omega_o$ it is then possible to express the generator's coefficient K from relations (6) and (7):

$$n - N/2, K = K_o\frac{1}{4} + \frac{n}{N} \tag{8}$$

-continued $$n - N/2, K = K_o \frac{n}{N} 2 - \frac{n}{N} \quad (9)$$

In order to attenuate the current fluctuations resulting from the non-DC electromotive force, it is necessary as already stated to connect in series an inductor of virtually the same electrical size as the one used for the motor function.

For operation in the generator mode, it must be recalled that the electronics must perform a dual role consisting, firstly, of maintaining the output voltage constant irrespective of changes in angular velocity and, secondly, of obtaining identical torques produced by the two machines.

To this end, variation of the position of the machine control means is effected at regular time intervals, the value of each interval being:

$$\Delta T = T/M$$

where
T = total discharge time
M = number of control steps.

The time intervals being regular, calculations (not made here) indicate that control must be modified for constant energy differences.

The relationship between current and voltage must take account of two imperatives, to wit, maintaining the output voltage constant irrespective of velocity modifications and obtaining identical torques on the two momentum wheels.

These requirements then impose two basic relations:

$$i_1 + i_2 = I \quad (10)$$

$$K_1 i_1 = K_2 i_2 \quad (11)$$

where
$i_1$, $i_2$ are the currents delivered by the two momentum wheels,
I the current drawn by the load
$K_1$, $K_2$ are coefficients characteristic of the momentum wheels and given by relations (8) and (9) above.

Figure 19:
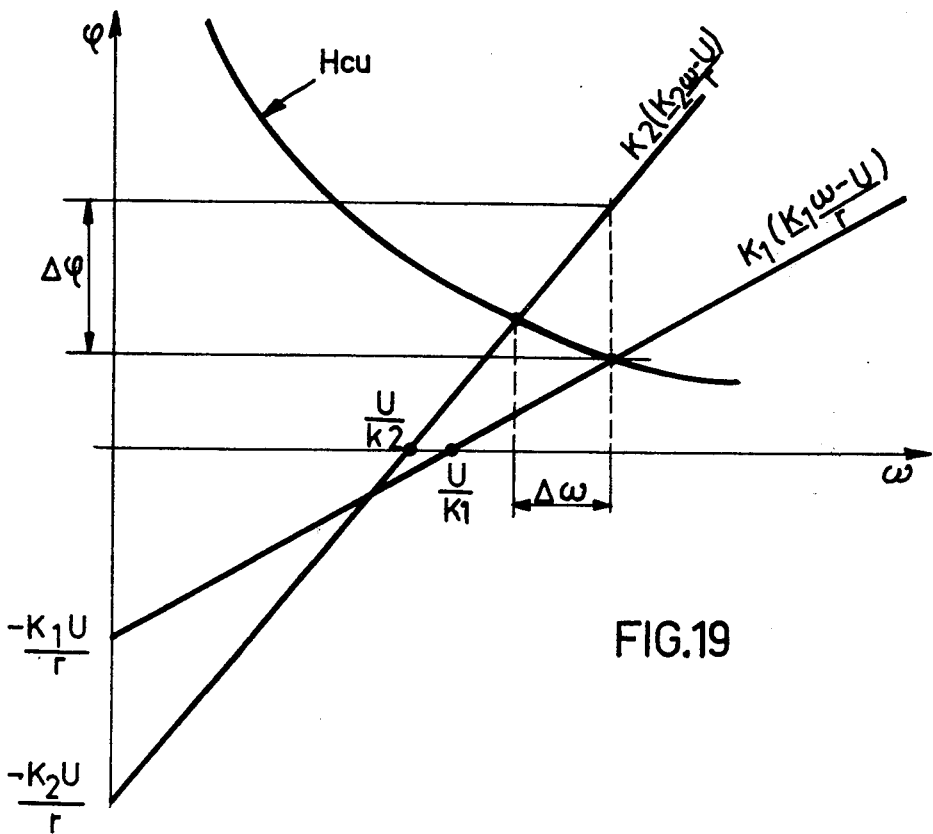
FIG. 19 is a diagram showing how the point of operation in the generator mode shifts as the control position is changed.

Expanded calculations (not given here) provide a simplified presentation of the torque quantity given by the useful torque hyperbola Hcu which is indicated on FIG. 19 and determined from the relation $\varphi = P/(\omega_1 + \omega_2)$, where P is the power delivered and $\omega_1$ and $\omega_2$ the respective velocities of the two machines.

FIG. 19 also shows how the torque applied to the momentum wheel evolves when a fresh value of K is applied, the demonstration of which is similar to that made for the motor, and it is to be noted that modifying the control corresponds to a change of straight line and that during the energy recovery cycle the device will sweep the set of straight lines K1, K2 . . .

The generator which delivers the signals for producing the switching windows is an essential element of the channel, for it is on the basis of the leading edge of these signals that positioning of the control input means is established.

Figure 23:
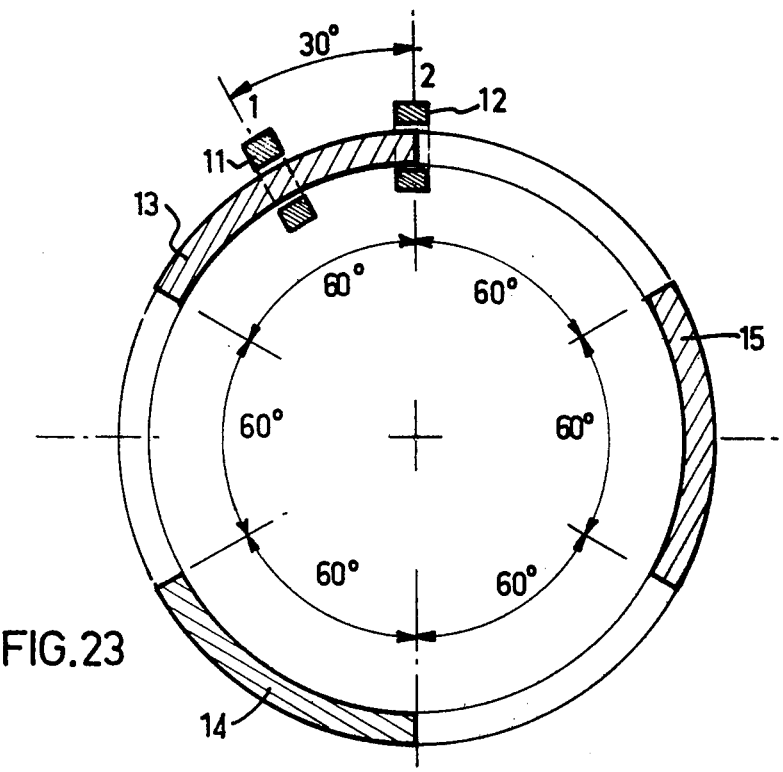
FIG. 23 is a diagram showing the disposition of the pick-ups.

This generator could be formed, for instance, by an oscillator having its inductor positioned near the rotor. Three metal pieces 13, 14, 15 fast with the rotor, pass through the air gap of two rings 11, 12 forming the inductor and modify their quality coefficient, as shown in FIG. 23.

Figures 20, 21:
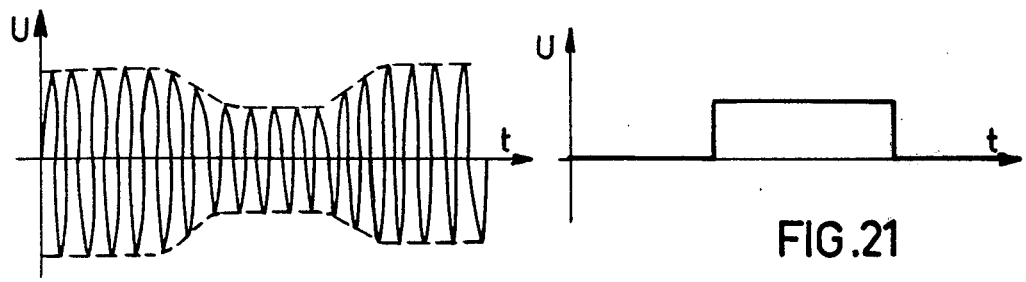
FIGS. 20 and 21 are diagrams representing the signals received by the pick-up.

The voltage produced by this oscillator, which oscillator is contained in each output control unit 8 and 9 and in each velocity control unit 4 and 5, is filtered and then applied to an error detector which converts the signal into a logic command, as shown in the diagrams in FIGS. 20 and 21.

It should be noted that, because of the control means positioning accuracy required, the maximum permissible error in the triggering threshold must be less than 20 mV for machines rotating at about 700 rps.

However, the result must be weighted by the fact that the switching windows F1, F2, F3 and F4 are generated on the basis of two signals S1 and S2 outphased by one window (represented by one-twelfth of a revolution).

Figure 22:
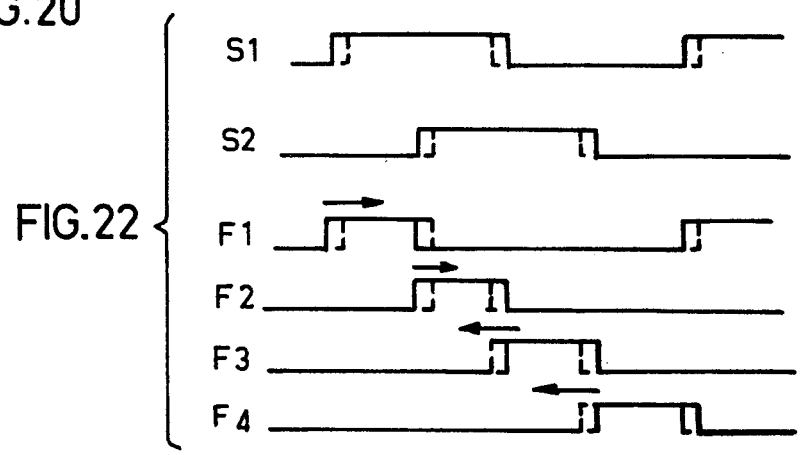
FIG. 22 is a diagram showing the manner in which the control gates evolve as the pick-up signals vary.

Consequently, as shown in FIG. 22, any variation, in one sense, in the detection instants is compensated for by an opposite variation in the last two windows, which is tantamount to saying that these differences must theoretically cancel out in one revolution of the rotor, and that in reality the accuracy required in the triggering thresholds could be less stringent.

Reference to FIGS. 23 through 26 and to FIG. 3 shows the angular disposition of the rings and the manner in which the switching signals are processed.

In the case of a machine with six magnets, the metal parts 13, 14, 15 passing through the air gap in rings 11 and 12 are arranged to form three 60-degree sectors, the said rings being spaced 30° apart.

Figure 24:
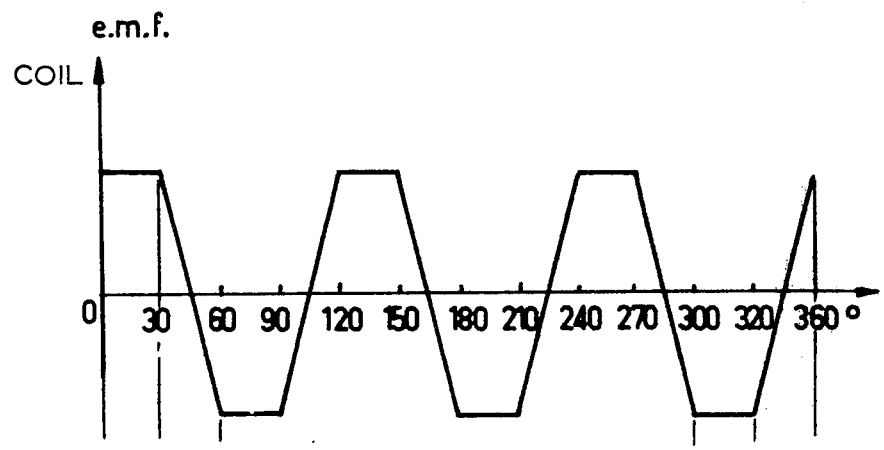
FIG. 24 is a graph depicting the form of the electromotive force in a single coil.

Referring to FIG. 24, it will be seen that under such conditions the electromotive force induced in a coil during a complete revolution of the rotor will be of trapezoidal shape, in accordance with the induction laws expounded precedingly.

Figure 25:
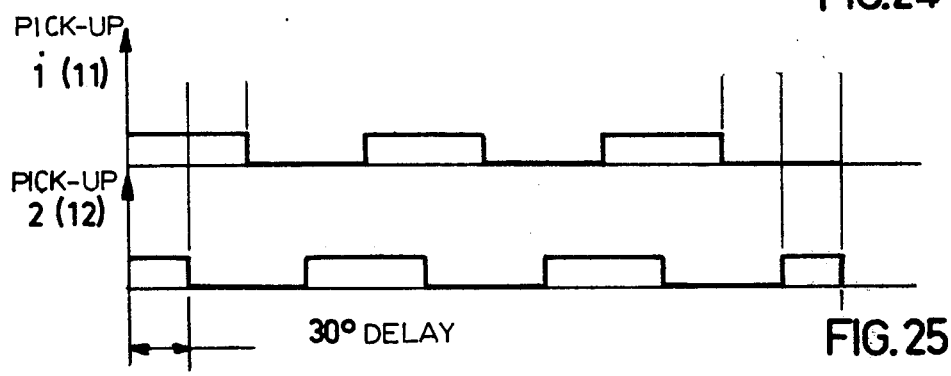
FIG. 25 is a graph portraying the shape of the switching signals.

At the same time, the rings 11 and 12 have generated signals of the shape shown in FIG. 25. When these signals are decoded they assume the shape shown in FIG. 26 and are then usable directly for controlling the switching commands applied to each coil.

Before proceeding any further with the description, it is proposed to briefly recall the basic features of the subject method of this invention for steering a spacecraft and regulating its onboard voltage by means of two motor/generator dynamo-electrical machines contrarotating about the same axis. These basic features are as follows:

In the energy storage function, each machine, which then functions as a motor, receives electrical energy from solar generators through the medium of power switches which, at specific instants in time, switch the power source onto the stator windings of the machines.

Further, velocity monitoring systems have as their function to control the power switches, such control being effected from synthesized data relating to position, rotor angular velocity and commands from a velocity control input generator.

In the energy recovery function, each machine, which then functions as a generator, supplies energy to a load formed by the satellite's onboard equipment, the power switches being the same as those used in the energy storage function and performing the function of switching the energy source onto the windings at each required moment in time.

Further, output monitoring systems are effective in synthesizing data relating to position, rotor angular velocity and commands from the output control generator, and furthermore control the power switches.

It is now proposed to describe the electronics required for operation of said machines, which electronics is separated, in accordance with a teaching of this invention, into control electronics and processing electronics, itself comprising a control means positioning unit and a computing unit.

In designating the various parameters used in the subject regulating method of this invention, reference will be made more particularly, in what follows, to the notation system referred to in the preamble.

Figure 27:
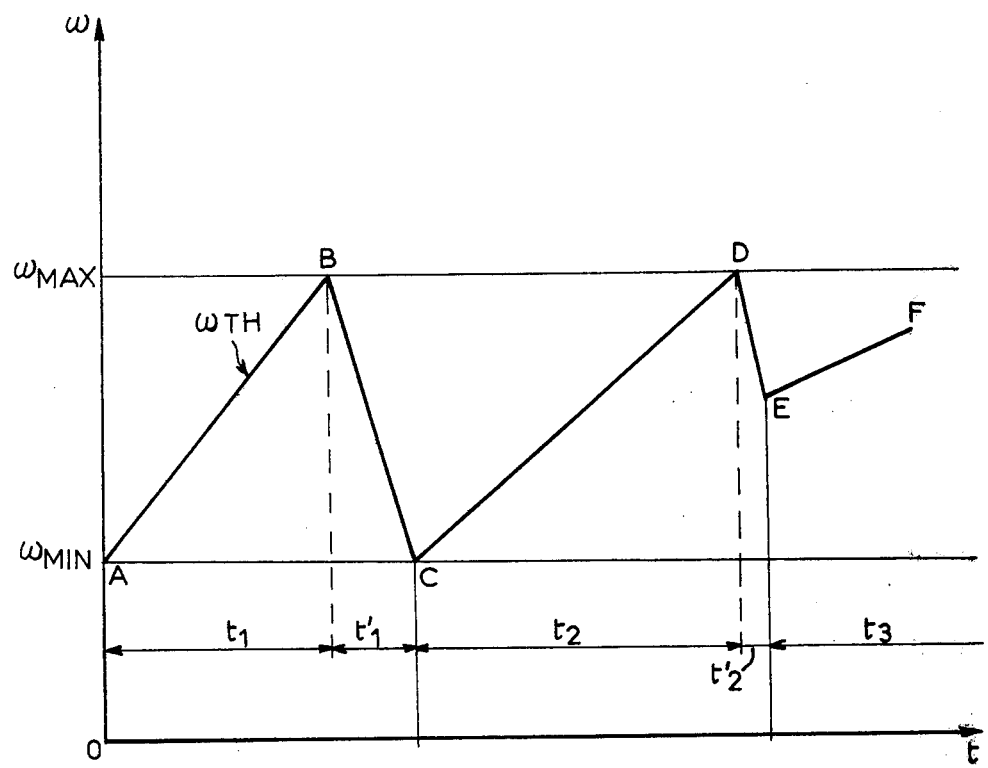
FIG. 27 is a diagram showing a possible operating cycle for the machines.

The graph ABCDEF in FIG. 27, in which angular velocity $\omega$ is represented along the y-axis and time t along the x-axis, schematically portrays the different possible forms of charging during motor phases AB, CD, EF, and of discharging during generator phases BC, DE, feasible on the basis of given starting conditions such as velocities $\omega_{MIN}$ and $\omega_{MAX}$ or charging times $t_1$, $t_2$, $t_3$.

This highlights the need to generate the theoretical velocity datum $\omega TH$—which varies between a minimum velocity $\omega_{MIN}$ limited by the recovered energy, and a maximum velocity $\omega_{MAX}$ limited by the mechanical characteristics of the machines—and the fact that it is additionally necessary to take account of the steering function which may introduce corrections into the system that could cause the machine velocities to drift towards these limit values.

Figure 28:
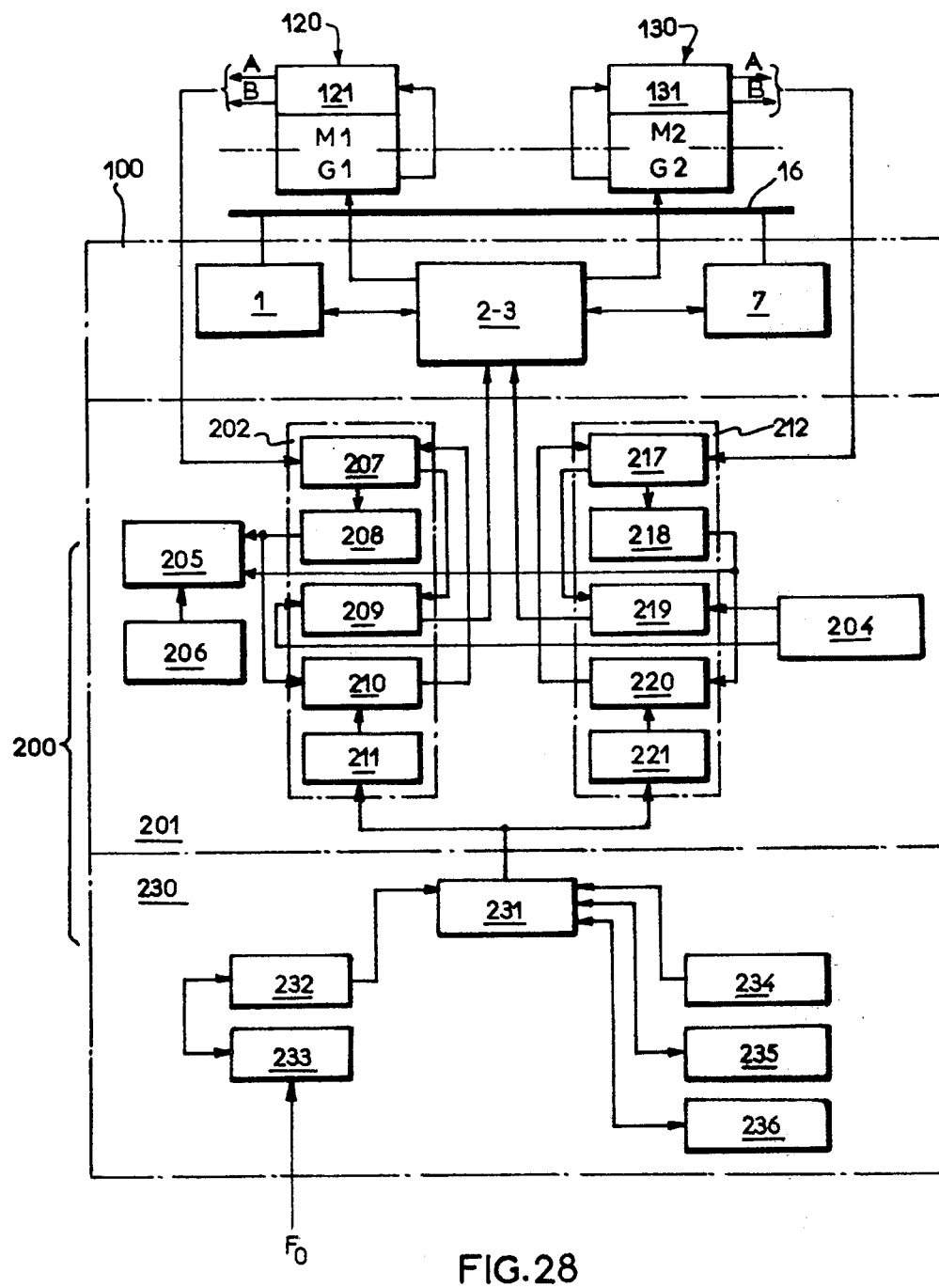
FIG. 28 is an overall block diagram showing the arrangement of the components required for operation of the machines.

Reference is next had to FIG. 28 for a block diagram of the overall arrangement of the various components for performing the functions needed to carry the invention into practice.

In accordance with this invention, the overall installation is shown in this block diagram as being divided into two main parts designated by reference numerals 100 for the control electronics and 200 for the processing electronics, respectively, the latter part being subdivided into a machine momentum-wheel positioning unit 201 and a computing unit 230.

More specifically (see FIGS. 28 and 29), the control electronics portion 100 basically includes power switches generally designated 2 and 3, interconnection switches 101, 102, 103 and 104, two control voltage generators 105 and 106, and diodes 107, 108, 109, 110, 111, 112, 113 and 114, the electrical connections being made on the one hand to a solar generator 1 and the satellite's power supply 7 and, on the other hand, to the general current distribution busbar 16.

Further, the stators of machines 120 and 130 are energized as shown in respect of their windings L1, L2, L3, L4 and L'1, L'2, L'3, L'4, and two inductors L' smooth the current in order to obtain a low ripple ratio, as described in the main patent.

Control means positioning system 201 basically includes two subsystems respectively designated 202 for machine $M_1G_1$ and 212 for machine $M_2G_2$ and common mode-changeover, switching and sequencing functional units 204, 205 and 206 respectively. Subsystem 202 of machine 120 comprises functional units for delay control 207, for start-of-gate detection 208 and for converting detection into control commands 209, and a counter 210 and read-only memories 211. Similarly subsystem 212 of machine 130 comprises functional units for delay control 217, for start-of-gate detection 218 and for converting detection into control commands 219, as well as a counter 220 and read-only memories 221.

Computing system 230 includes an arithmetic unit 231 and functional units 232 for computing $\omega TH$, 233 for processing the frequency Fo, 234 for computing $\Delta\omega C$, 235 for computing $\Delta\omega 1$, and 236 for computing $\Delta\omega 2$.

As explained precedingly, in the matter of detecting the machine rotor/stator position, signals S1–S2 are given by pick-ups in logic form, and these pick-ups are contained in units designated 121 and 131 fast with the machines forming the systems 120 and 130. The signals S1–S2 are conveyed via the pick-up channels A and B to delay control means 207, 217 as shown in FIG. 28. The control electronics must in any event include generation means of the analog circuits mainly comprising the power switches and its associated circuitry. As shown in FIG. 30, the power switches— which are contained in units designated 2 and 3 in FIG. 29, and themselves respectively designated 2a, 2b, 2c, 2d and 3a, 3b, 3c, 3d—include four cascade-connected high-voltage transistors T1, T2, T3, T4, and the circuit is devised so that the whole of the current passing through each switch should also pass through each coil.

Diodes D1, D2 eliminate all return voltage on the switch terminals. Further diodes D3, D4 connected around the control transistor T5 prevent application of a return voltage to the base-emitter junction of said transistor.

As shown in FIG. 30, the manner of connection of the power supply bus 16 is such that each switch is controlled off the voltage generators 105–106 that either generate 60 V from a source c for application during operation in the generator mode, or 5 V from a source b for application during operation in the motor mode, or from a source a for speeding up the machines during the acquisition phase.

Furthermore, irrespective of whether the machines are in the charging (motor) mode or in the discharging (generator) mode, it is necessary to avoid any anomaly liable to cause a too high current output through the machines. A current limiting circuit is accordingly provided that operates on the same principle as the machine, that is, in either a motor or a generator configuration.

A voltage proportional to the current flowing through each machine is accordingly tapped off the terminals of resistors R1–R2 and applied to a trigger circuit included in each generator 105 and 106. Thus when the current exceeds the maximum value set by a reference voltage, the logic output state of the trigger circuit disables the switches controlling the coils of each machine, for a predetermined time period.

If the anomaly persists, disabling of the switches will occur cyclically.

Figure 29:
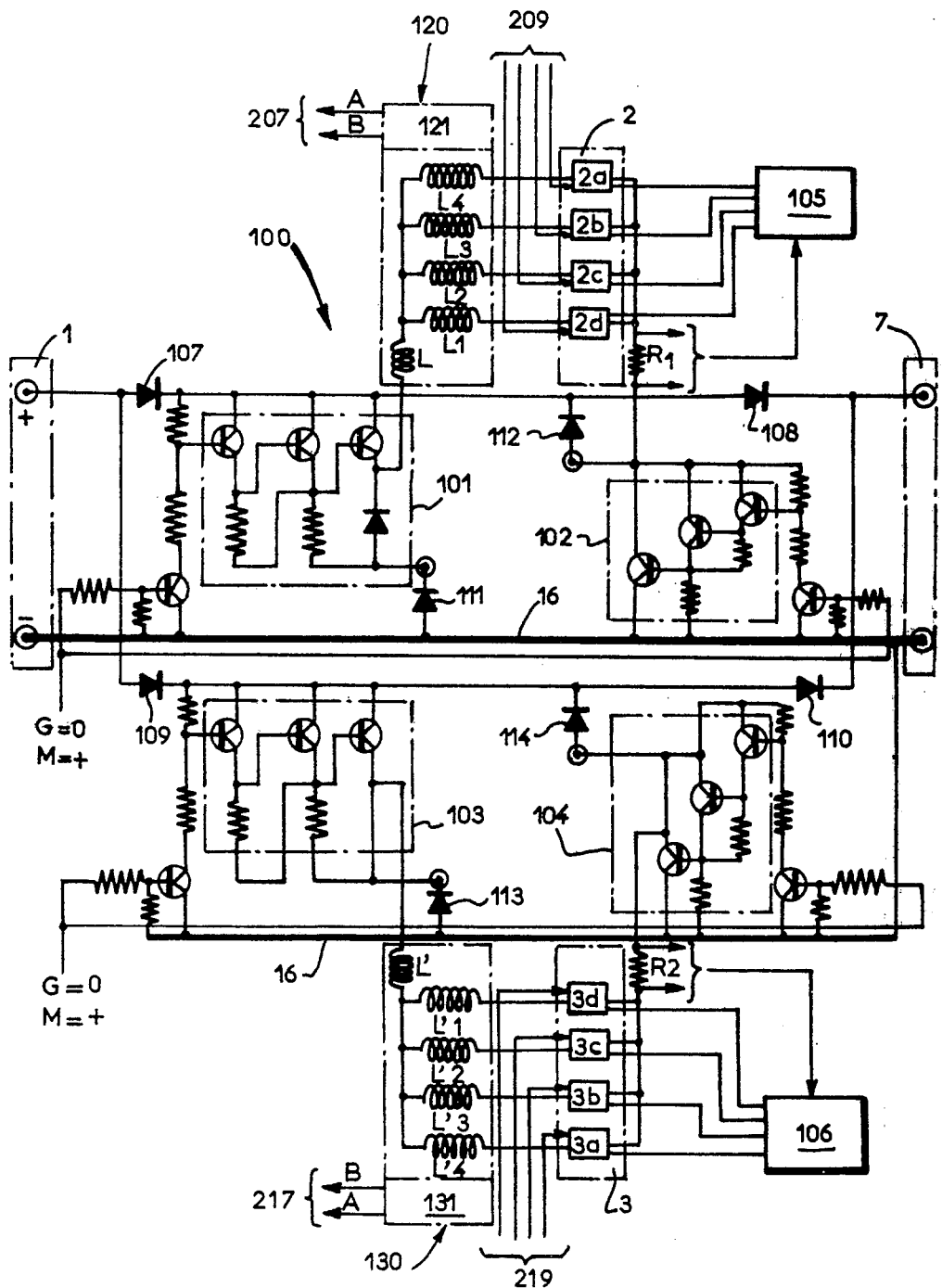
FIG. 29 is a circuit diagram showing the arrangement of the components forming the control electronics.
Figure 30:
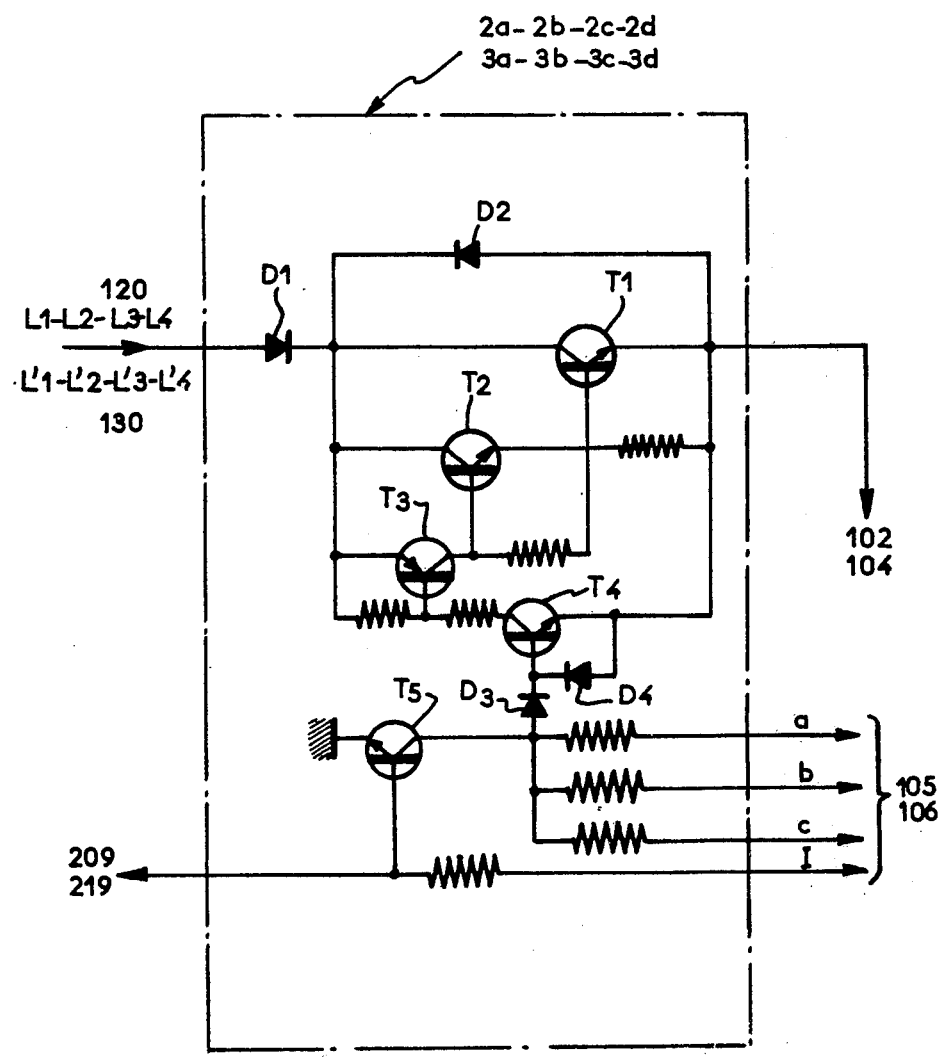
FIG. 30 is a circuit diagram of the power selectors.

As shown in FIG. 29, the machines are connected into a bridge circuit, enabling the same power switch to be used both in the motor and the generator mode.

The machines are thus so connected electrically that switches 101, 102, 103, 104 should be conducting while the machines operate in the motor mode, and diodes 111, 112, 113, 114 should be conducting while the machines operate in the generator mode.

Further, diodes 107 and 109 isolate solar generator 1 during operation in the generator mode, and diodes 108 and 110 isolate one machine from the other if either of them experiences a failure.

Figure 31:
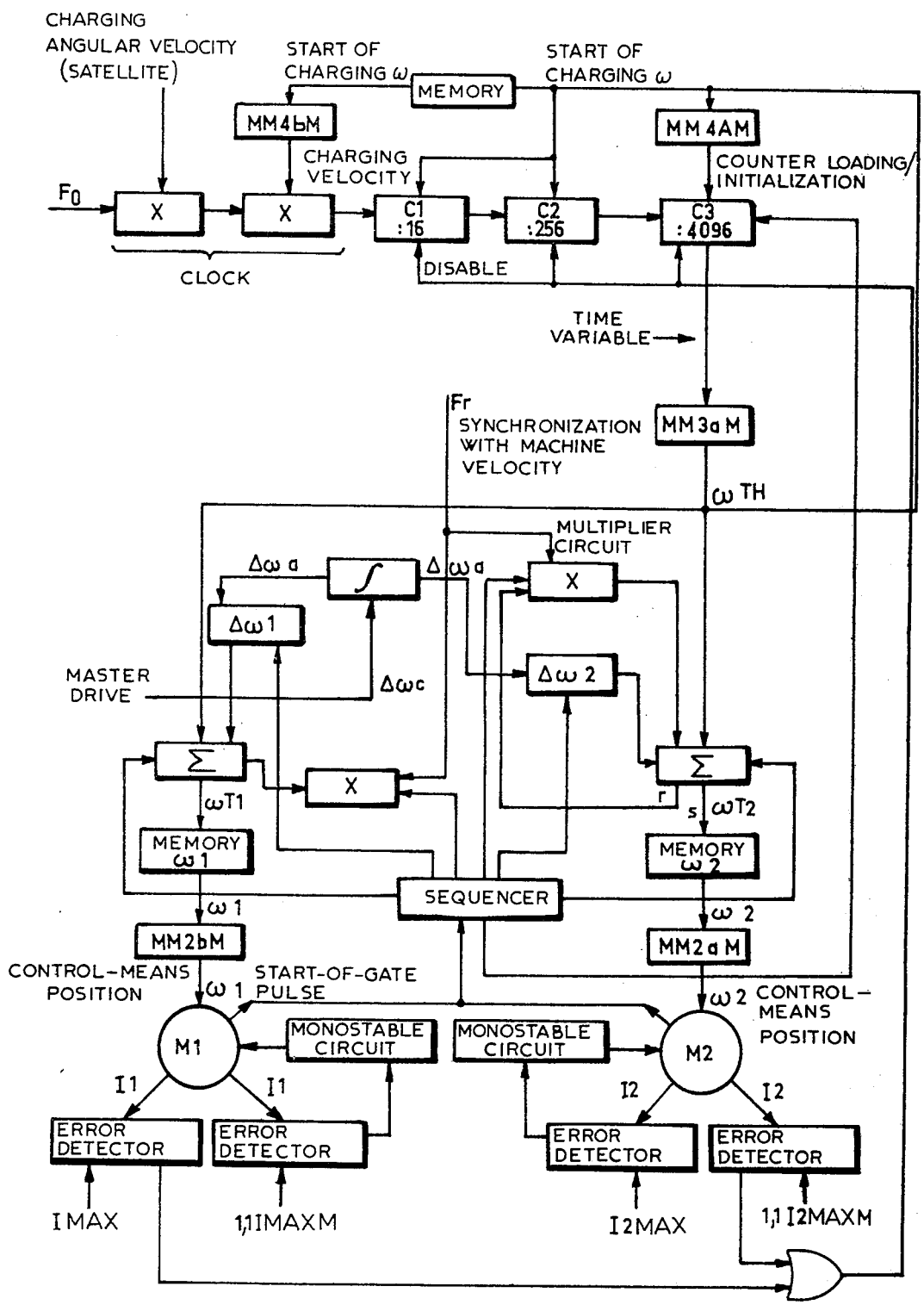
FIGS. 31 and 32 are functional block diagrams in the motor and generator modes respectively.
Figure 32:
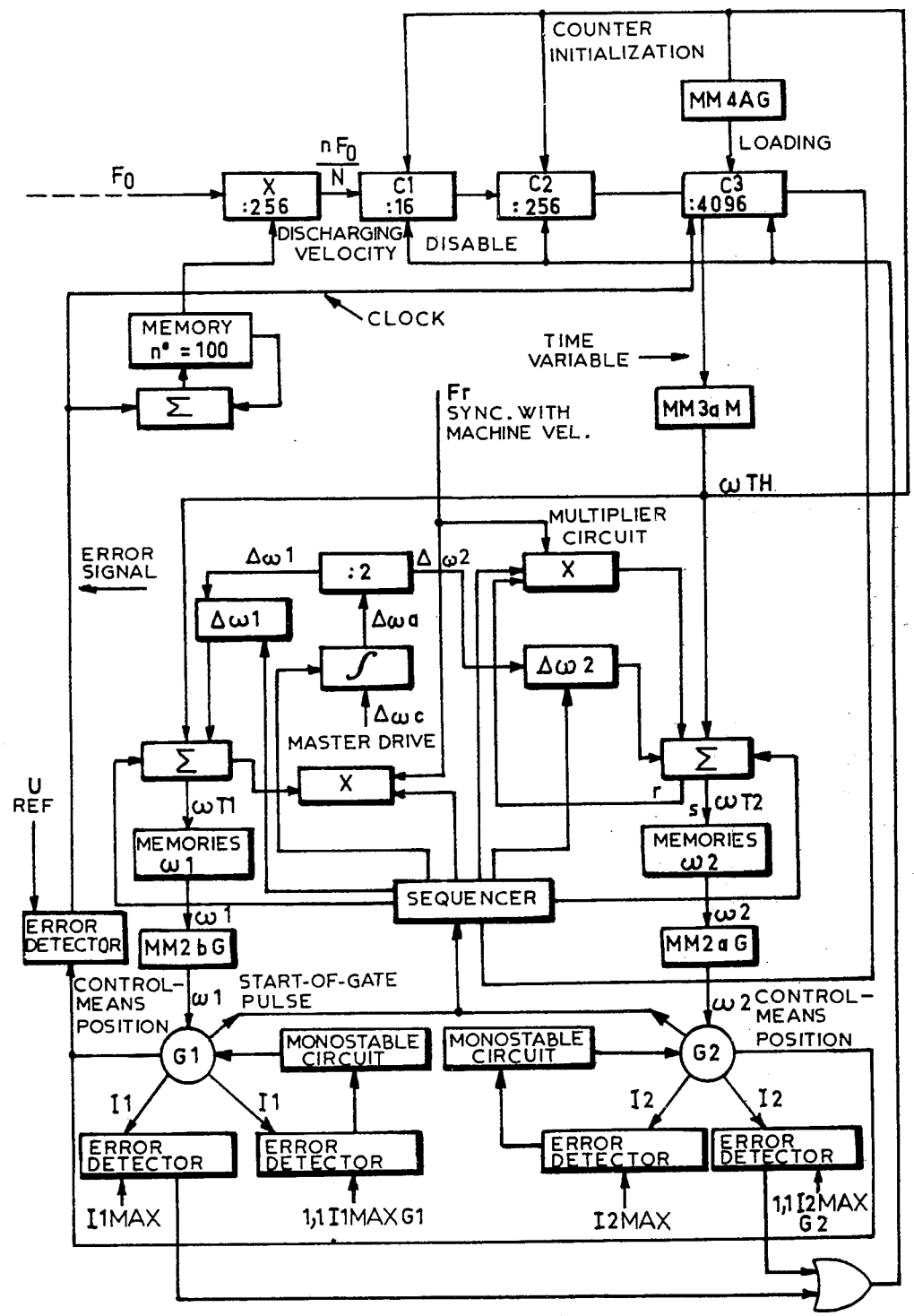
Figure 33:
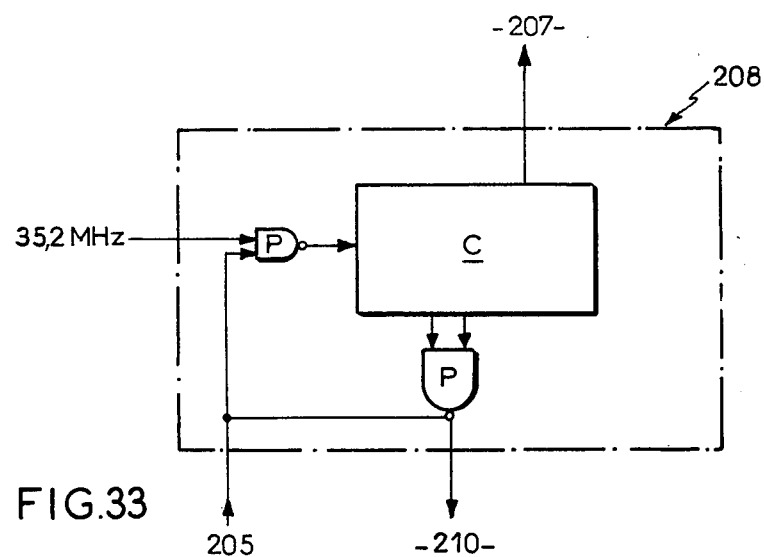
FIGS. 33 and 34 are diagrams showing the gate leading-edge detection means.
Figure 34:
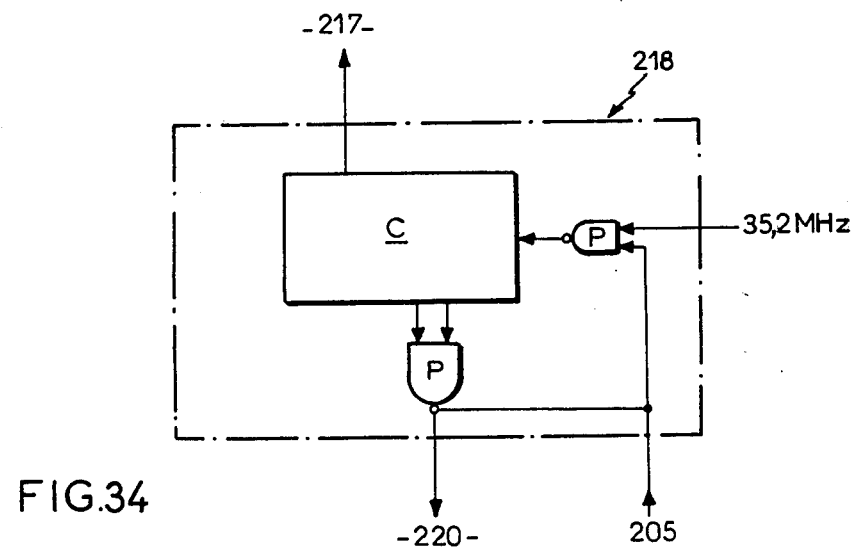
Figure 35:
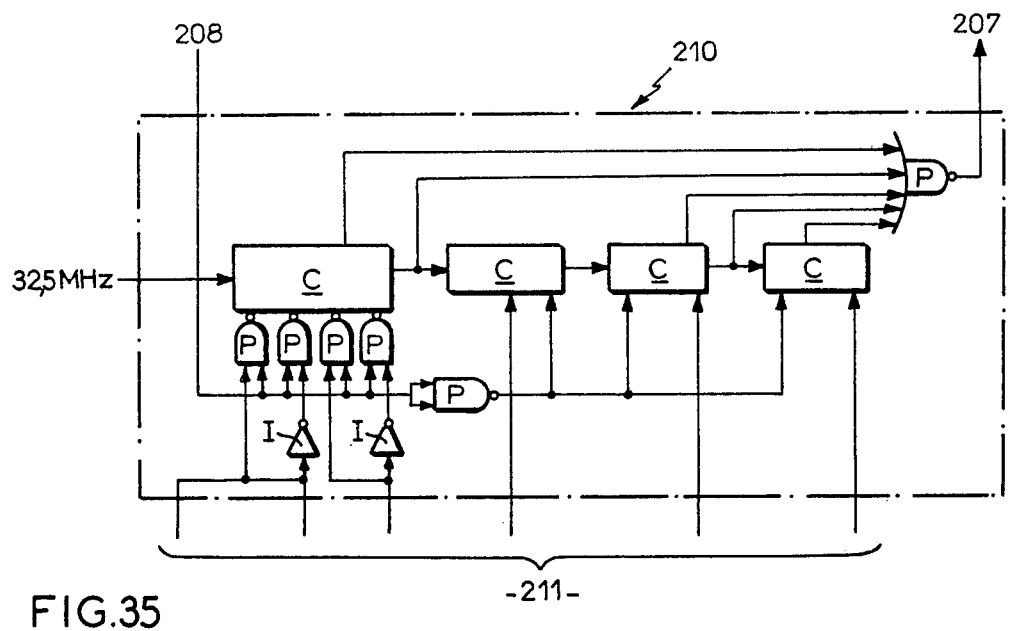
FIGS. 35 and 36 are diagrams illustrating the counter circuits.
Figure 36:
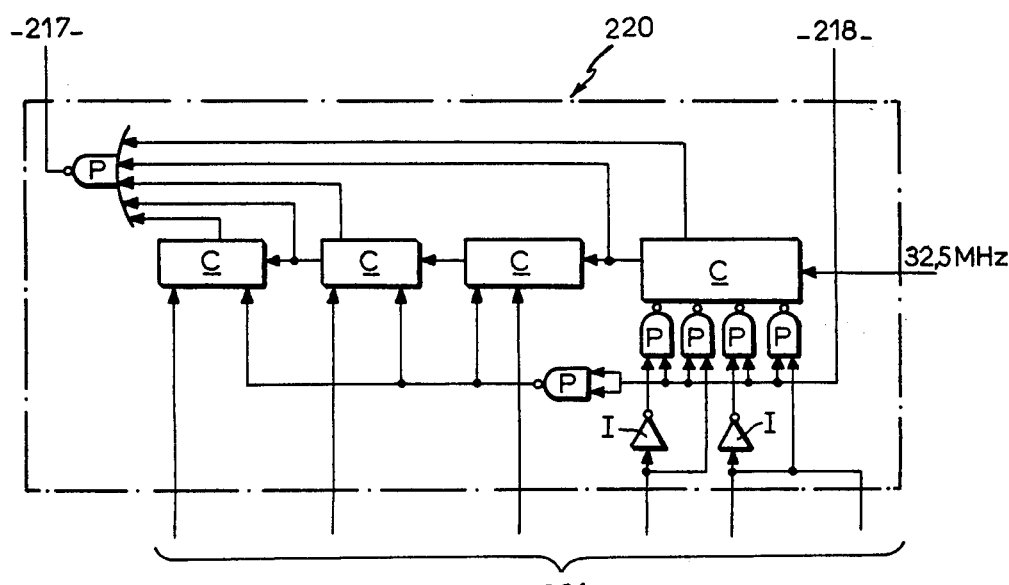
Figure 37:
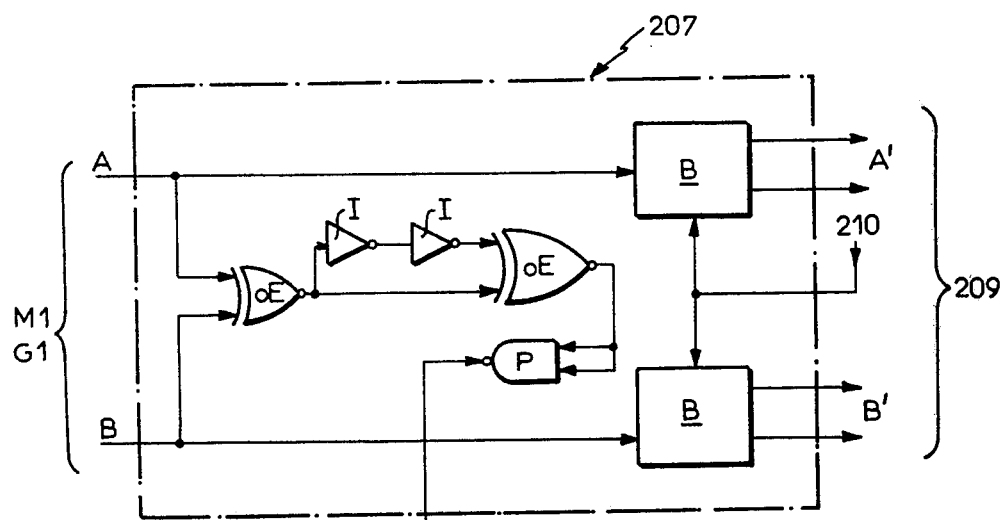
FIGS. 37 and 38 are circuit diagrams of the delay control means.

The processing electronics performs all the operations shown on the block diagrams in FIG. 31 relating to the motor mode and in FIG. 32 relating to the generator mode.

The processing electronics is split up into ten elemental parts functionally designated in FIG. 28 as follows:

Ref. numeral 202: Control means positioning for machine 120
Ref. numeral 212: Control means positioning for machine 130
Ref. numeral 206: Sequencer
Ref. numeral 231: Arithmetic unit
Ref. numeral 234: Computation of $\Delta\omega C$
Ref. numeral 235: Computation of $\Delta\omega 1$
Ref. numeral 236: Computation of $\Delta\omega 2$
Ref. numeral 204: Change of operating mode
Ref. numeral 232: Computation of $\omega TH$
Ref. numeral 233: Processing of frequency Fo.

Each control means positioning system includes:
for machine 120, a subsystem 202 comprising:
A delay control unit 207
A start-of-gate detection unit 208
A detection/control conversion unit 209
A counter 210
A read-only memory 211
and for machine 130, a subsystem 212 comprising:
A delay control unit 217
A start-of-gate detection unit 218
A detection/control conversion unit 219
A counter 220
A read-only memory 221

The system is completed by a sequencer switching means 205.

The elements listed hereinbefore permit processing by means of predetermined laws based on studies of the dynamic behaviour of the machines. These studies have enabled correspondence tables to be established between various physical quantities that must be present during the different processing phases, and these tables are stored in read-only memories 211 and 221.

The data to be stored are obtained from calculations performed on a computer.

Such a method does not call for highly sophisticated processing, making it possible to use a wired logic for its implementation while minimizing the number of circuits used. Only the volume of the data to be stored in the read-only memories remains large, with more than twelve K-words of twelve bits each in this instance.

Regarding the performance characteristics of such a system, it is to be noted that it behaves perfectly in the region of the initial operating conditions but that performance deteriorates somewhat as one departs from these nominal conditions.

However, any other convenient self-adaptive type of processing could be resorted to, but would involve extensive calculations and would require to be performed with a microprocessor.

Figure 5:
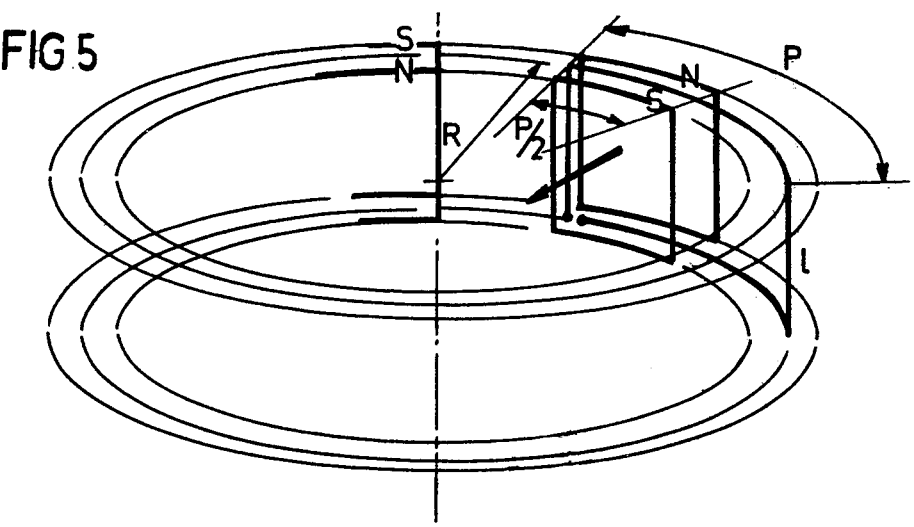
FIG. 5 is a fragmental diagrammatic showing of an elemental part of the machine of FIG. 3.

In the energy storage cycle, the 'theoretical angular velocity $\omega TH$' datum is generated on the basis of a set of counters $C_1$, $C_2$, $C_3$, as shown in the block diagram in FIG. 5. The clock function is provided by a multiplier circuit which modulates the frequency Fo as a function of two 'charging velocity' data, one of which is provided by the satellite and the other from read-only memory MM4bM.

This read-only memory and read-only memory MM4aM receive upon their address inputs the start-of-charging velocity stored in a register. A further function of memory MM4aM is to initialize the counters.

As already recalled on FIG. 27, modulation of the clock frequency and initialization of the counters permit of performing charging cycles with totally different initial conditions.

Thus memory MM3aM delivers the theoretical velocity $\omega TH$ datum on the basis of the time variable.

With regard to generation of the 'control means position' datum, the velocity correction $\Delta\omega_C$ commanded by the steering function is memorized by an integrating circuit $\int$ and is applied to two summing units $\Sigma$ which receive the theoretical velocity datum $\omega TH$ on their second inputs.

A multiplier circuit X reduces the information produced by the summing unit to a time-modulated datum, and this is performed on the basis of a frequency Fr synchronized with the angular velocities of the machines.

Presetting of this estimated velocity datum obtained thus on the address inputs of read-only memories MM2aM and MM2bM allows obtaining the required control-means position as an output. In the event that the current absorbed by a machine should exceed a preset maximum value, protection circuits would react immediately.

As shown in the block diagram in FIG. 32, in the energy restitution cycle the velocity datum $\omega TH$ is likewise generated from a set of counters $C_1$, $C_2$, $C_3$, but here an additional constraint arises because, in addition to equalization of the torques, it is necessary to match the machine outputs to load variations.

In this case the clock circuit is a multiplier circuit which modulates its output frequency as a function of a 'discharging velocity' datum.

This 'discharging velocity' datum is slaved to the output voltage and a double-threshold type of comparison is made between the voltage delivered and a reference voltage. The resulting error signal is sampled, then added to the number 'n' characterizing the pre-correction discharge.

Adjusting the sampling frequency thus permits of optimizing the slaving system's response.

The correction process does not permit of rapidly compensating for a change in the position of the control means following a variation in the load. Modification of the control means position is effected with a correction to the contents of the time counter.

The operating principle is similar to that of the clock frequency monitoring function, except that the comparison thresholds are different.

Since it is impossible to know exactly the end-of-charging velocity, it is necessary to initialize the counters so as not to introduce perturbations in the satellite at the start of the discharging cycle. The role of read-only memory MM4AG is therefore to initialize the counters; thus it receives on its address input the start-of-discharging velocity and this datum is stored in a register after each computing cycle.

Generation of the 'control means position' datum is similar to generation of the datum in the energy storage cycle. The velocity correction commanded by the steering function is memorized by an integrating circuit and the datum is applied half each to the two machines in order to allow for the fact that the total current furnished by the two generators must remain constant.

The fact of applying the control input for varying the velocity differential half each to the two machines causes an increase in the velocity of the one and a decrease in that of the other in order to obtain the required moment.

Further, because variations in the currents are of opposite sign on the two machines, the power delivered to the load is maintained constant.

Limitation against overcurrents is accomplished by the same circuits as in the motor mode, and only the preset maximum current values are different.

As will readily be understood from the block diagrams in FIGS. 31 and 32, the same are absolutely identical both in the energy storage and in the energy restitution cycles. This was a design goal so as to minimize the number of circuits required for performing the functions.

Reference to FIG. 28 shows that each control means positioning functional system, to wit system 202 for machine 1 and system 212 for machine 2, comprises a number of component parts for the processing electronics.

For greater clarity in what follows, reference will be had, in describing each of said component parts, to whichever of FIGS. 33 through 49 portrays its functional diagram.

Further, it is to be noted that, in order to simplify a reading of these diagrams, use is made thereon of the following notation for designating the conventional electronic components shown thereon:

C = Counter
P = NAND or NOR gate
I = Changeover switch
OE = OR gate
B = Trigger
M = Monostable circuit
A = Adder
MM = Read-only memory
R = Register
D = Divider
Mu = Multiplier More specifically:

Detection of the gate leading edge by component 208 (FIG. 33) for machine 1 and 218 (FIG. 34) for machine 2, produces a pulse which writes into counters 210 (FIG. 35) and 220 (FIG. 36) the delay value to be applied to each control input.

Figure 38:
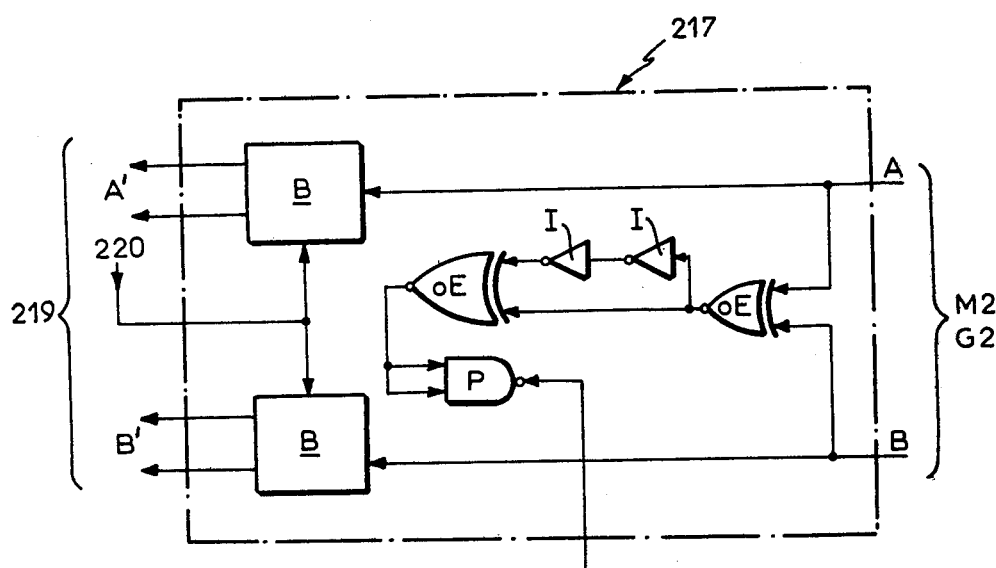

In switching to the zero state, each counter delivers a pulse which controls the delay system included in the delay control components 207 (FIG. 37) and 217 (FIG. 38).

Figure 39:
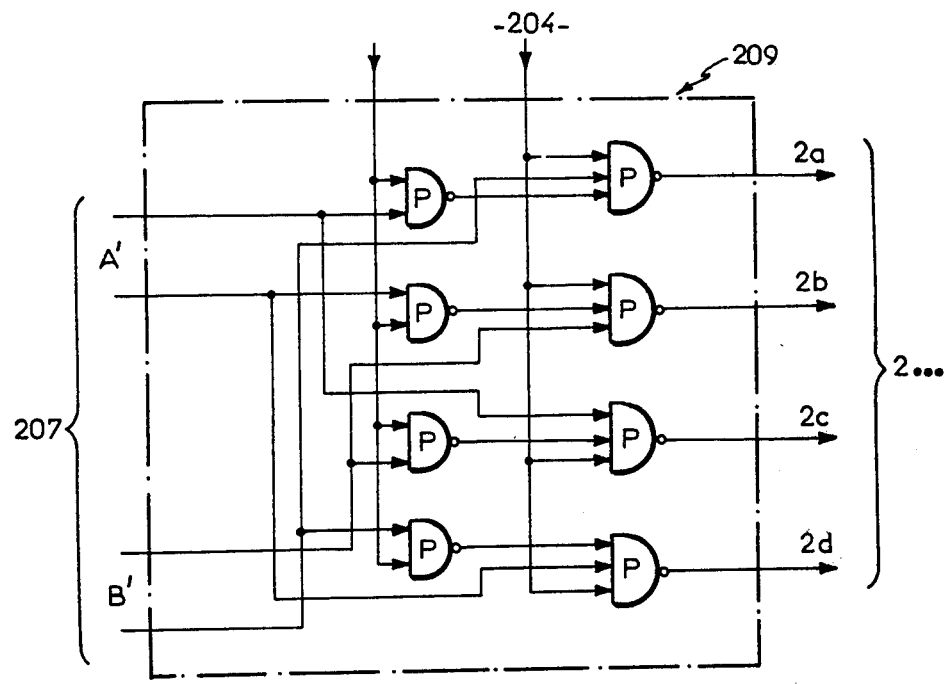
FIGS. 39 and 40 are diagrams of the circuits for converting detection into control.
Figure 40:
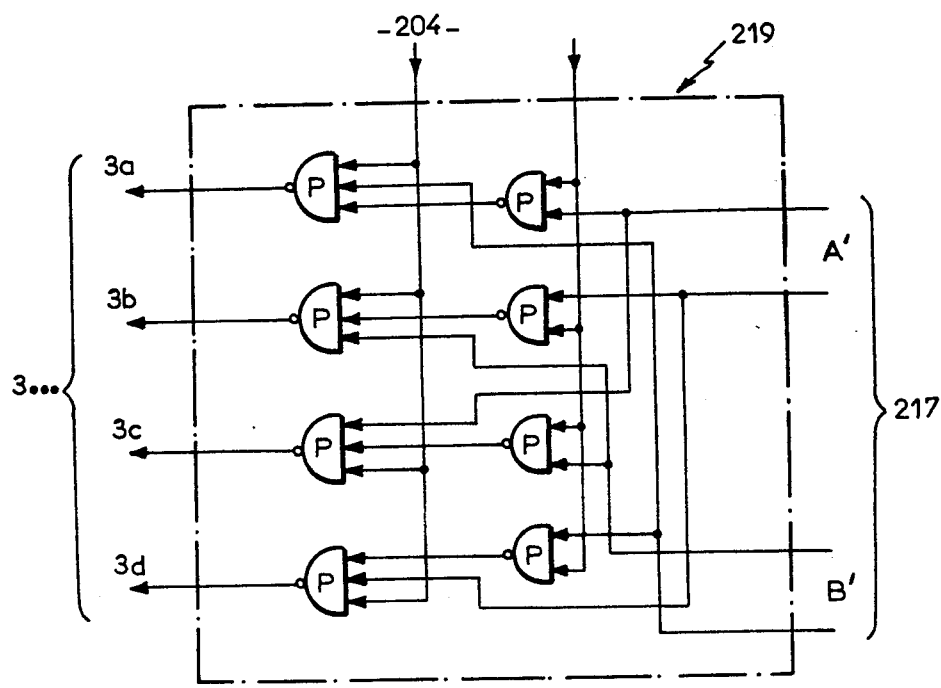
Figure 41:
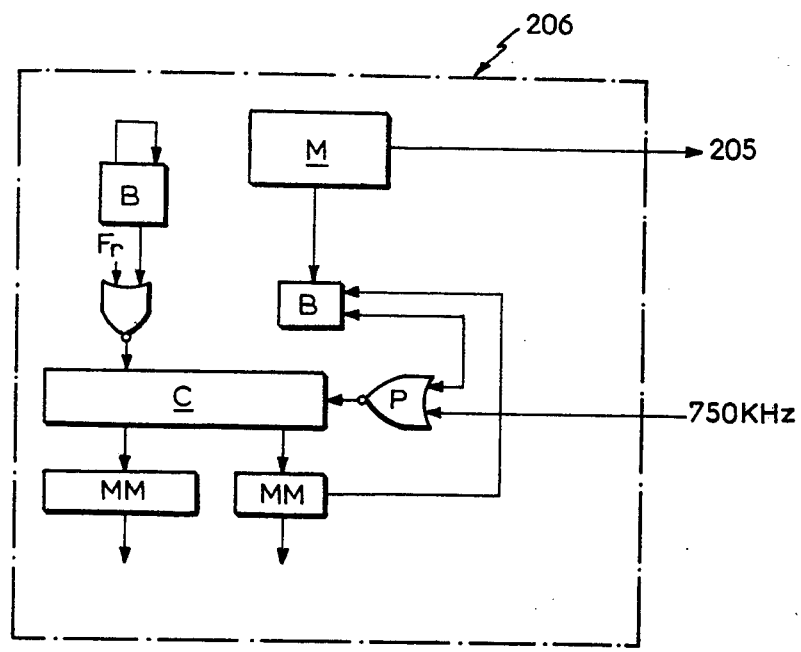
FIG. 41 is the sequencer circuit diagram.
Figure 42:
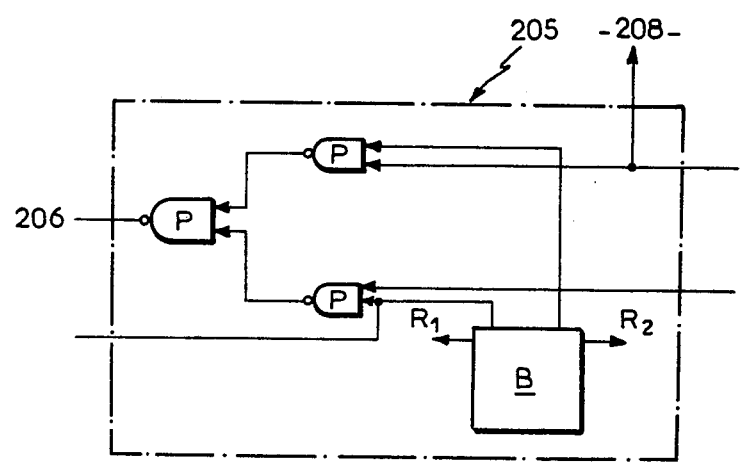
FIG. 42 is the sequencer switching circuit diagram.
Figure 43:
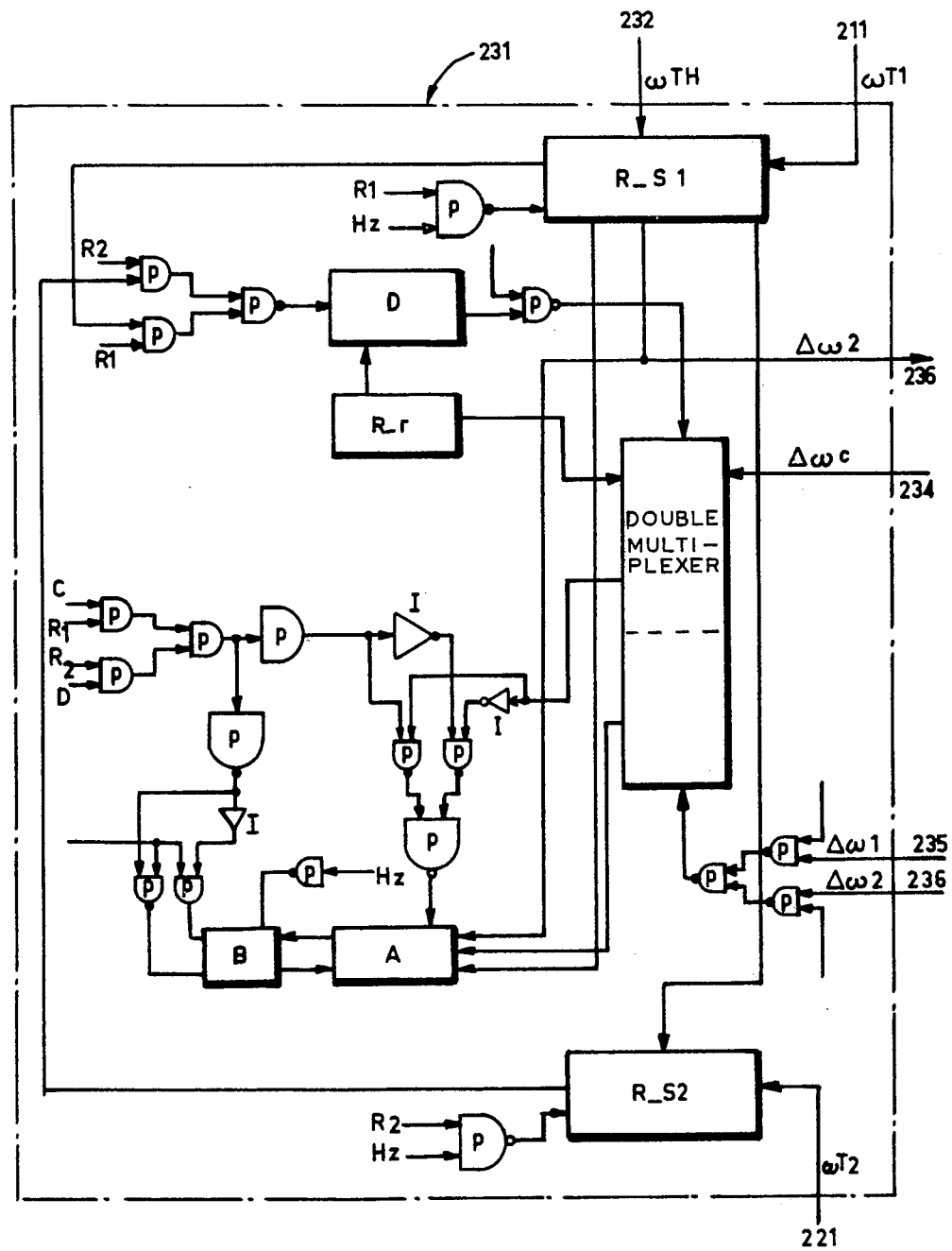
FIG. 43 is the circuit diagram for the arithmetic unit.

The principle whereby the detection is converted into a control input to be applied to each machine will now be described with reference to the diagrams in FIGS. 39 and 40.

The signals A' and B' from delay analysers 207 and 217 pass through the circuits of components 209 and 219 and are received at 2a, 2b, 2c, 2d and 3a, 3b, 3c, 3d on the base of transistors T5 (see FIG. 4) controlling high voltage transistors T1 through T4, referred to precedingly, in power switches 2 and 3.

The components can be disabled by a circuit for inhibiting command inputs from component 204.

The read-only memories of elements 211 and 221 are of a type well known per se and are connected between the registers contained in the arithmetic unit and counters 210–220.

Sequencer 206 and switching unit 205 must perform the following calculations in respect of each machine:

Read $\Delta\omega C$ in series
Integrate $\Delta\omega C$ and compute $\Delta\omega 1$, $\Delta\omega 2$
Read $\omega TH$ in the registers of the arithmetic unit
Detect generator/motor mode changeovers of each machine.

The sequencer proper accordingly includes a counter with a control frequency of 750 kHz and read-only memories controlled by that counter and delivering the necessary commands.

Activation of the sequencer is controlled by the start-of-gate pulses.

Arithmetic unit 231 (FIG. 43) basically includes an adder, a trigger, a double multiplexer, two registers s, a register r and a divider for dividing by 1/N in order to provide beat between two consecutive positions. Such a dividing circuit is rendered necessary by the fact that, for example, out of 4096 possible positions of the control means (12 bits) only 256 (8 bits) are used, whereas the precision required in respect of the perturbing moments produced by shifts in the control means requires use of the 4096 positions.

If a beat is set up between two consecutive positions of the 256 usable positions, it is possible to create fictitious positions.

If the space between two consecutive usable positions is divided into sixteen parts, there will then be 4096 positions obtained, 256 of them real and 3840 fictitious.

For instance, if the two consecutive positions are 123 and 124 and if position 123 is commanded every other time and position 124 every other time, this is equivalent to a position in the middle of the space included between positions 123 and 124.

Register s determines the 256 usable positions with an accuracy of twelve bits.

Register r determines the beat function, total capacity of which is 64 fictitious positions with a precision of 4 bits. $\Delta\omega C$ is calculated by component 234 (FIG. 20).

$\Delta\omega C$ represents the difference which the satellite requires in the angular velocities of the machines in order to generate a moment.

$\Delta\omega C$ will be written into the register in the series mode responsively to a command from the sequencer.

At the start of each sequence, $\Delta\omega C$ is recorded with its small weight first and sign last.

Figure 48:
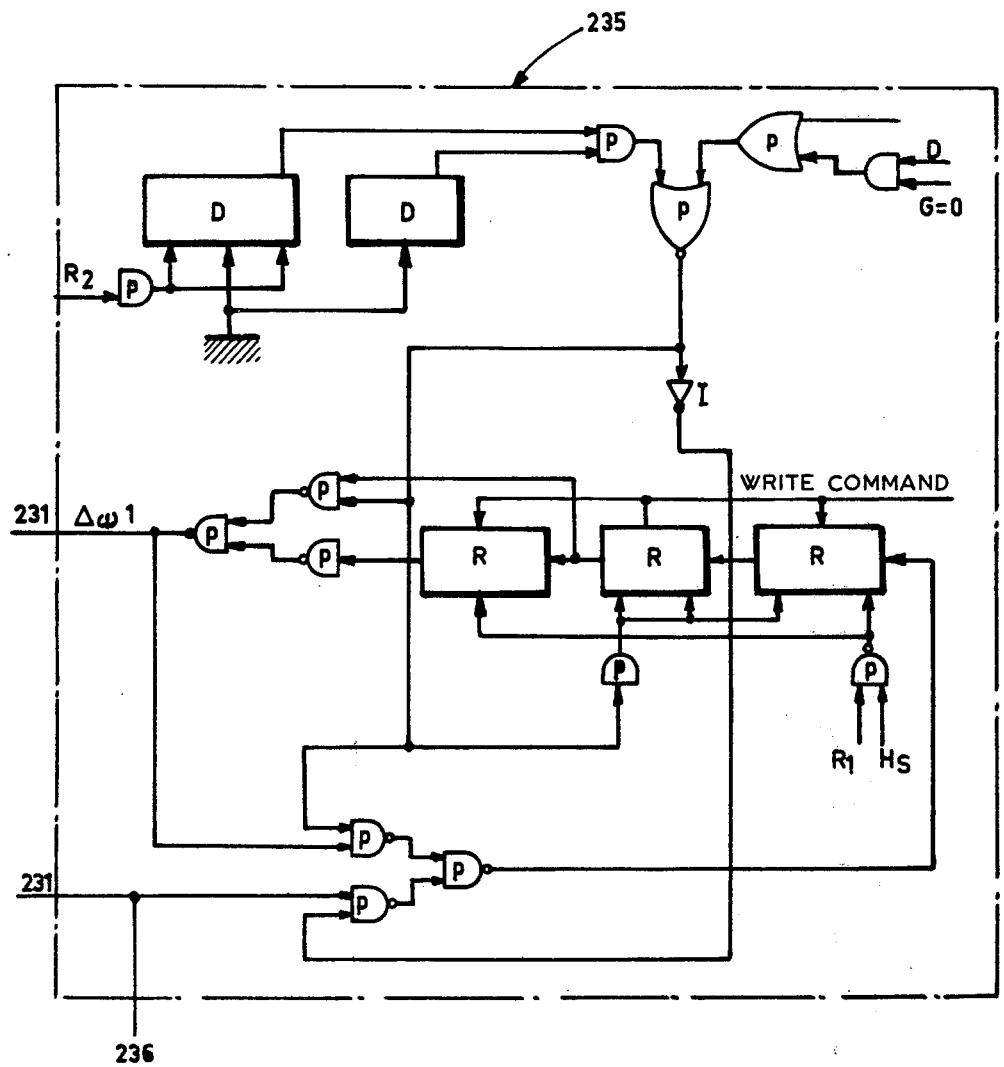
FIG. 48 is the diagram for the $\Delta\omega_1$ computing circuit.
Figure 49:
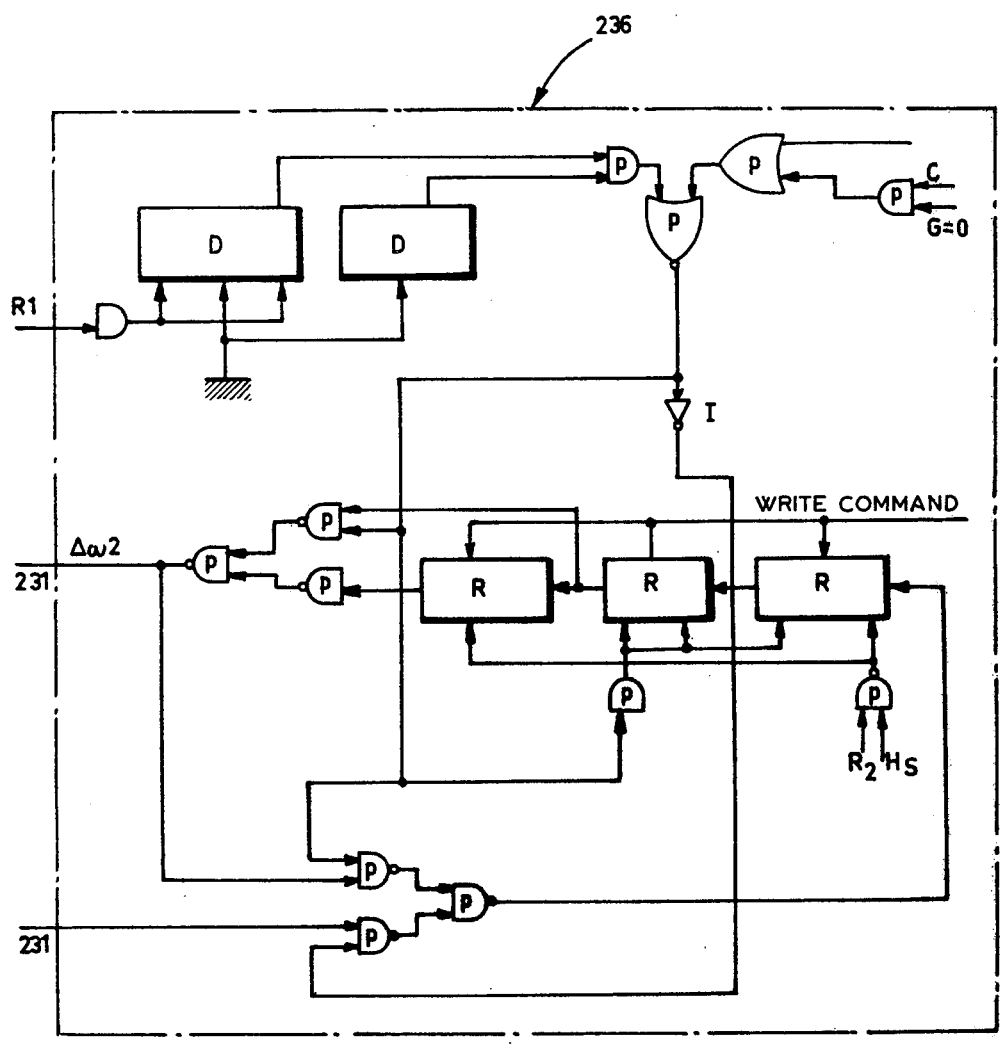
FIG. 49 is the diagram for the $\Delta\omega_2$ computing circuit.
Figure 50:
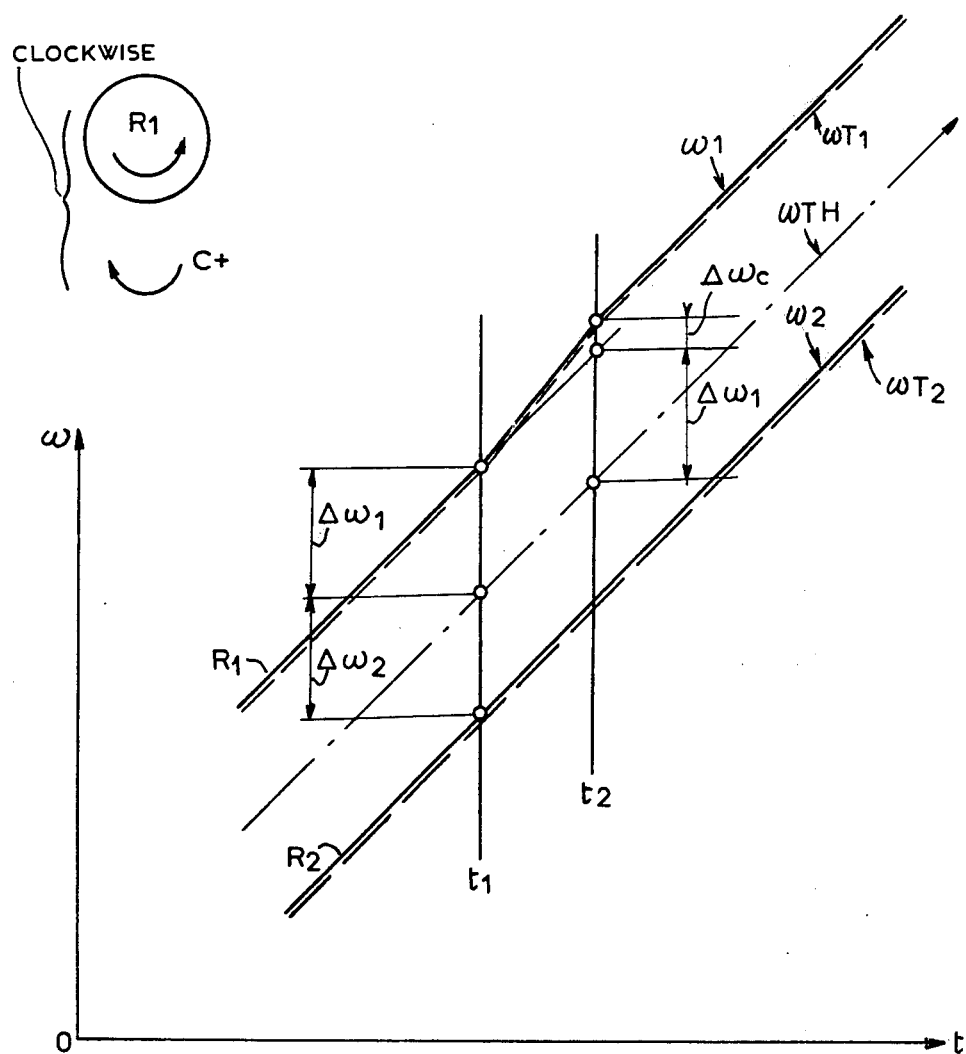
FIGS. 50 and 51 are graphs portraying operation in the motor mode.
Figure 51:
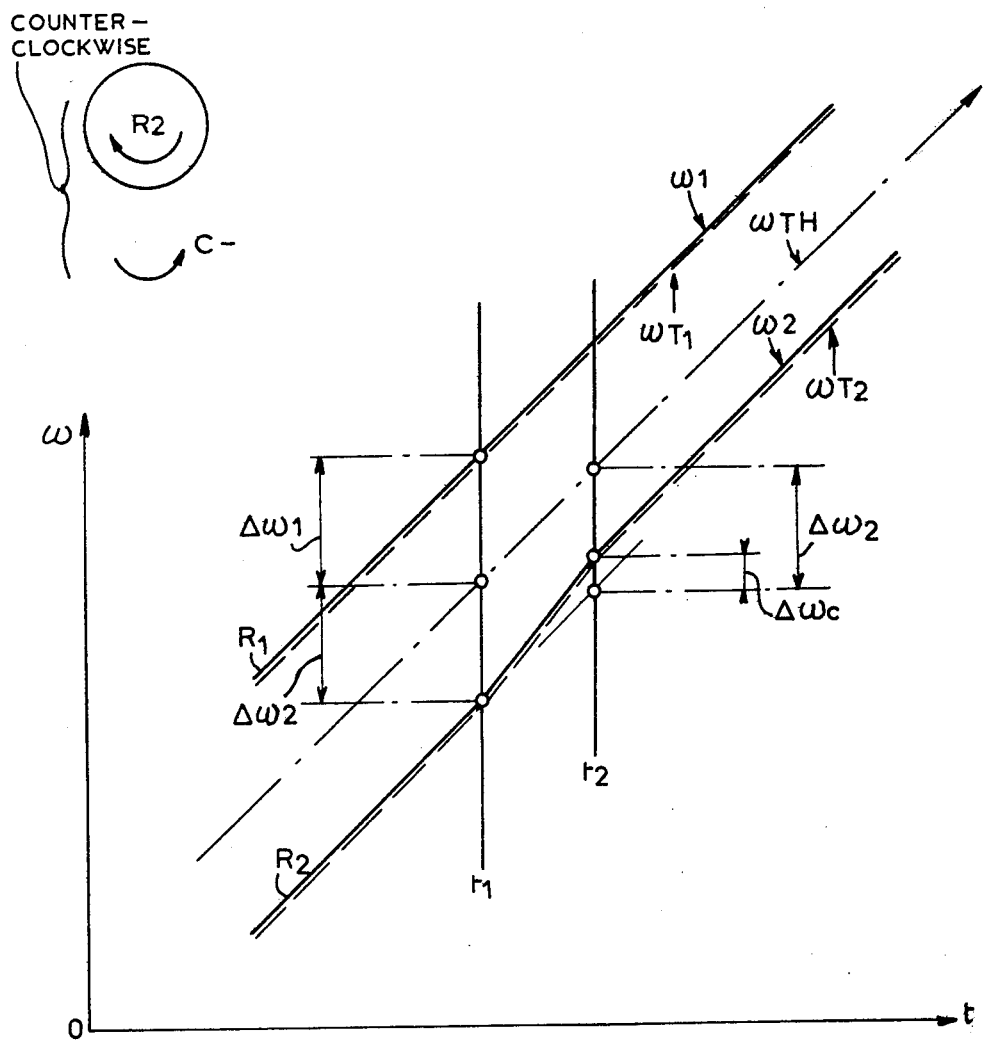

The manner of calculation of $\Delta\omega 1$, determined by component 235 and schematically depicted in FIG. 48, and of $\Delta\omega 2$, determined by component 236 and schematically depicted in FIG. 49, will be better understood by reference to the graphs in FIGS. 50 through 55.

It should be remembered once more that:

$\omega TH$ is the mean theoretical velocity of the two machines
$\Delta\omega 1$ is the difference between $\omega TH$ and $\omega T1$
$\Delta\omega 2$ is the difference between $\omega TH$ and $\omega T2$
$\omega T1$ is the theoretical angular velocity of machine 1
$\omega T2$ is the theoretical angular velocity of machine 2.

In the motor mode, a moment can be engendered only by speeding up one of the machines.

If the moment to be engendered is clockwise (SH), it will be obtained (FIG. 50) by accelerating R1 (machine 1) in such manner that $\omega_1$ increases and $$\Delta\omega 1 = \Delta\omega 1 + \Delta\omega C$$

$$\Delta\omega 2 = \Delta\omega 2$$

If the moment to be engendered is counter-clockwise (SAH), it will be obtained (FIG. 51) by accelerating R2 (machine 2) in such manner that $\omega_2$ increases and $$\Delta\omega 2 = \Delta\omega 2 - \Delta\omega C$$

$$\Delta\omega 1 = \Delta\omega 1$$

In the generator mode, $\Delta\omega C$ is applied simultaneously to the two machines but is halved in each case.

Figure 52:
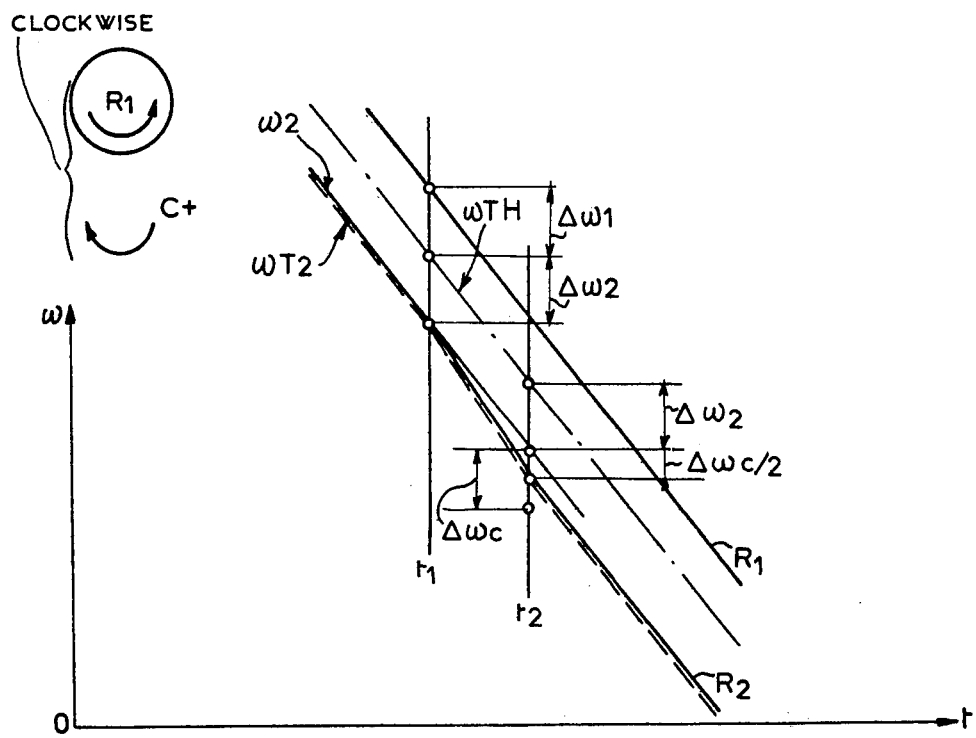
FIGS. 52 through 55 are graphs depicting operation in the generator mode.
Figure 53:
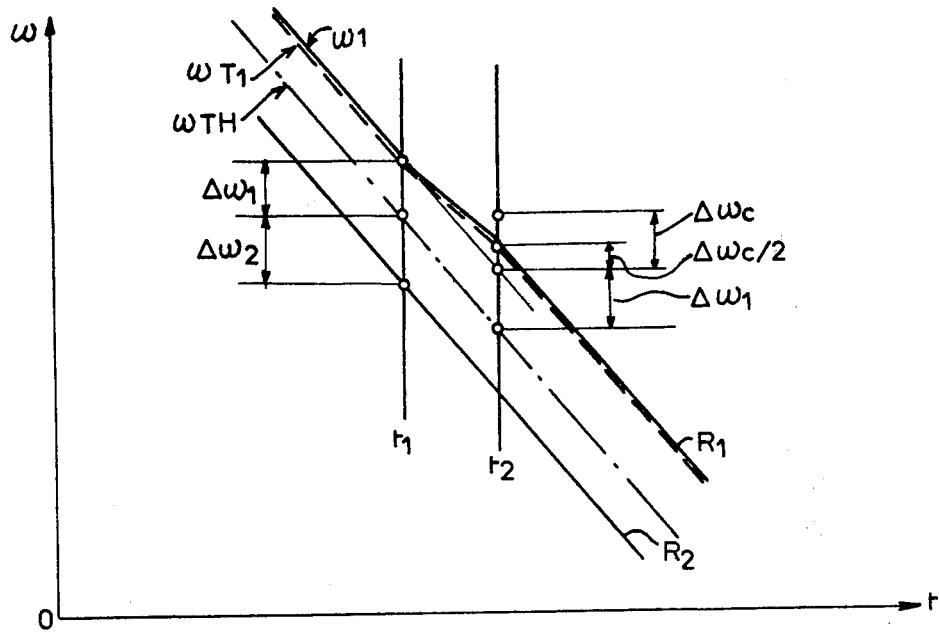
Figure 54:
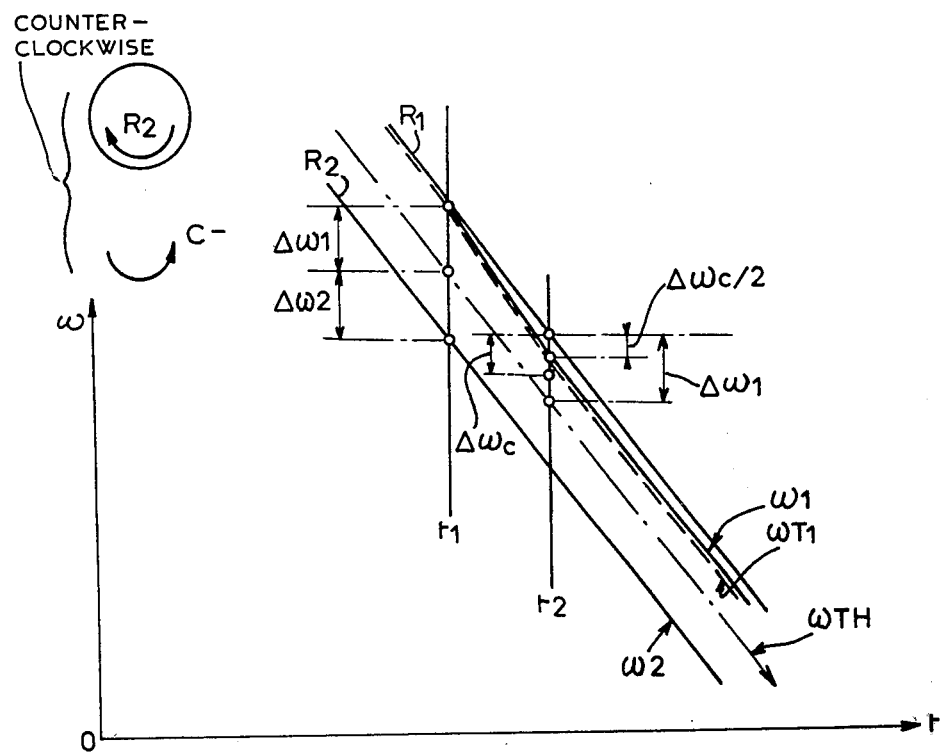
Figure 55:
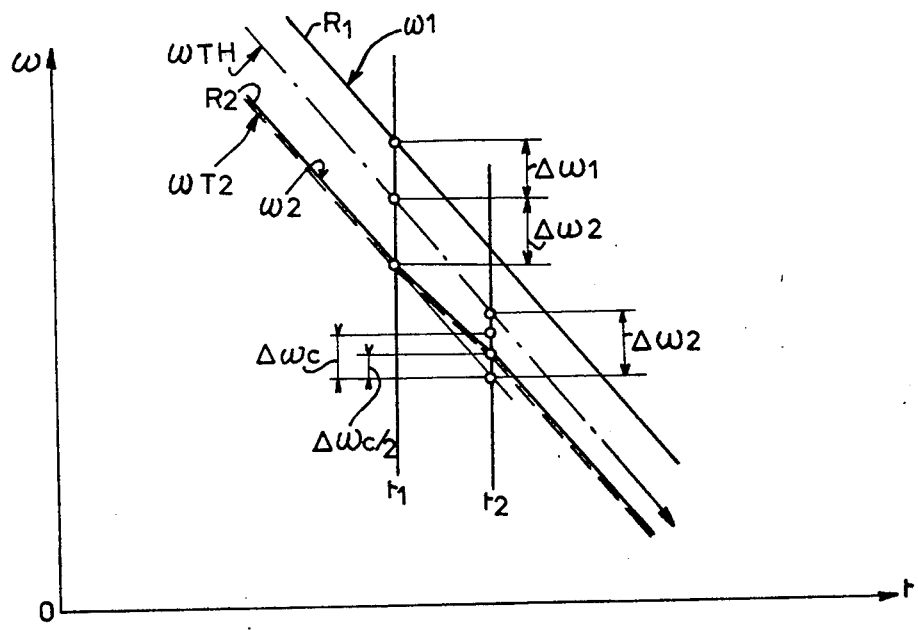

As shown in FIGS. 52 and 53, if the moment to be engendered is clockwise, it will be obtained by increasing the G2 output in such manner that $\omega_2$ decreases and $$\Delta\omega 2 = \Delta\omega 2 + (\Delta\omega C/2)$$

and by decreasing the G1 output in such manner that $\omega_1$ increases and
$$\Delta\omega 1 = \Delta\omega 1 + (\Delta\omega C/2)$$

If the moment to be engendered is counter-clockwise (FIGS. 54 and 55), such moment will be obtained by increasing the G1 output in such manner that $\omega_1$ decreases and $$\Delta\omega 1 = \Delta\omega 1 - (\Delta\omega C/2)$$

and by decreasing the G2 output in such manner that $\omega_2$ increases and $$\Delta\omega 2 = \Delta\omega 2 - (\Delta\omega C/2)$$

It should be noted that a single graph could be used for FIGS. 52-53 and 54-55 since application is made simultaneously.

Figure 44:
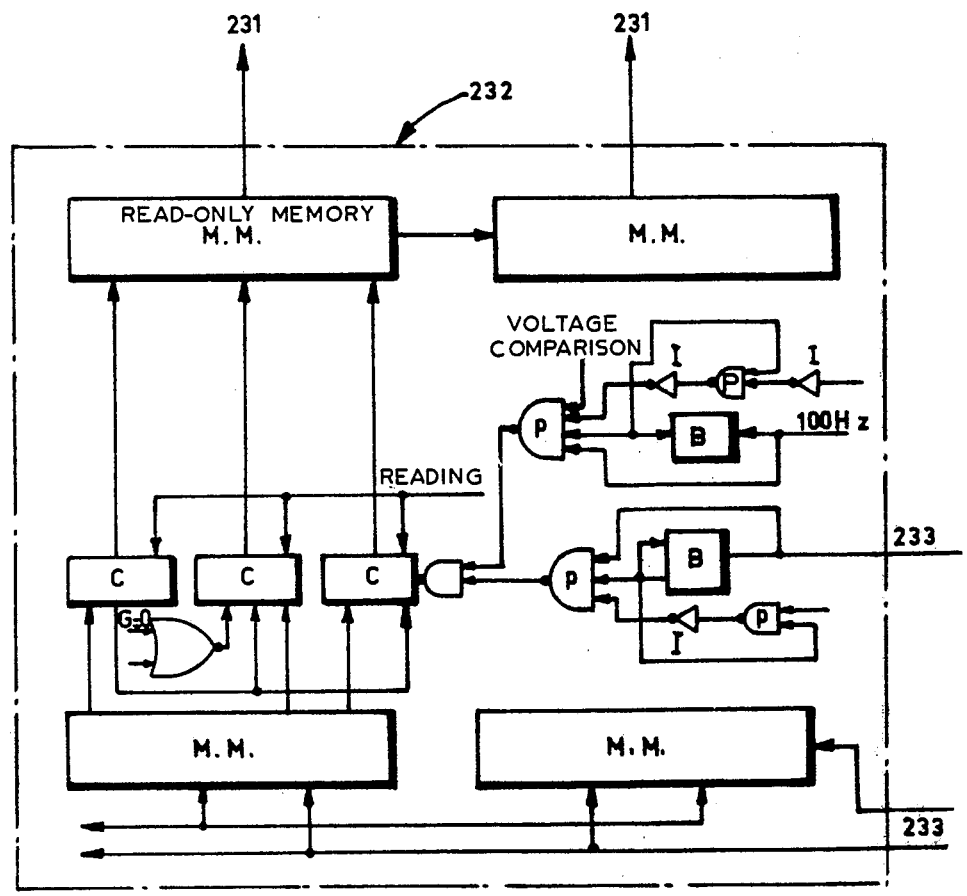
FIG. 44 is the diagram for the $\omega$TH computing circuit.

$\omega$TH is computed by component 232, as diagrammatically depicted in FIG. 44.

The system consists of a twelve-stage reversible counter and four 1024×12-bit read-only memories.

Figure 45:
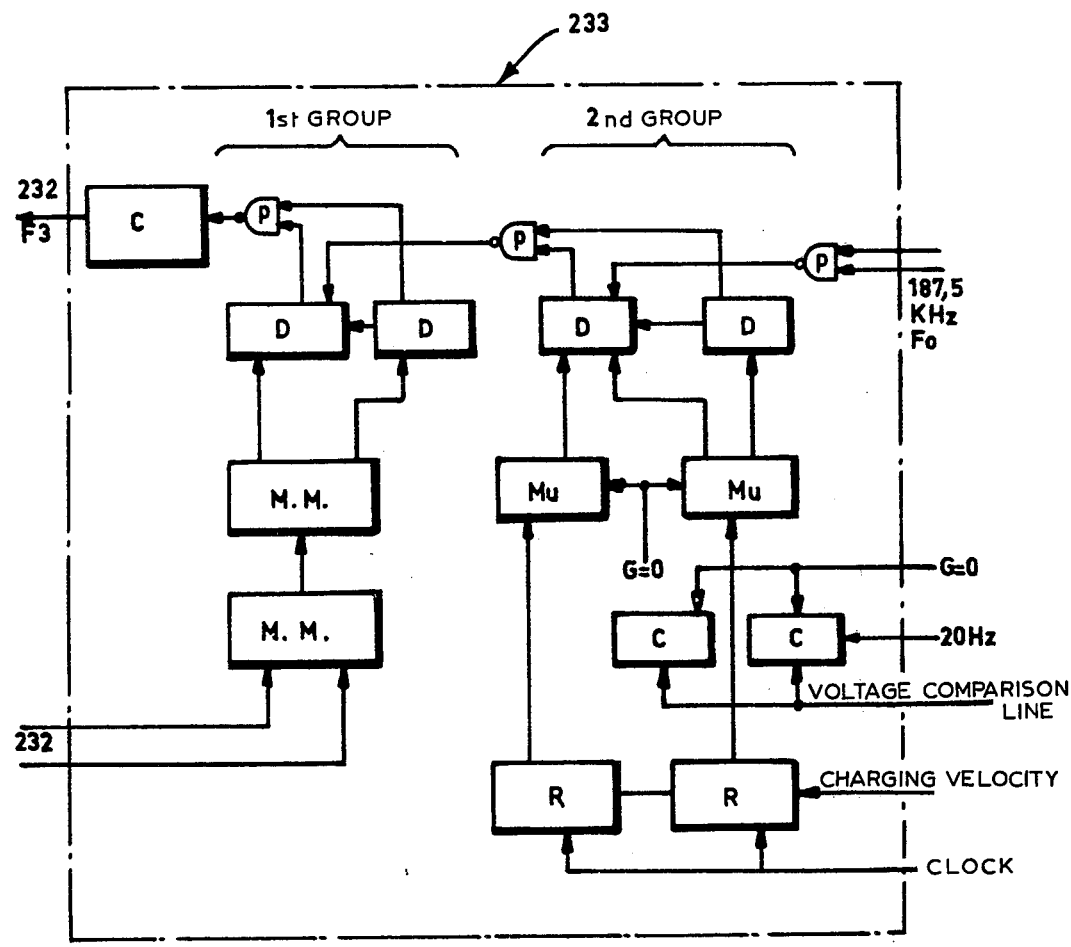
FIG. 45 is the diagram for the Fo computing circuit.
Figure 46:
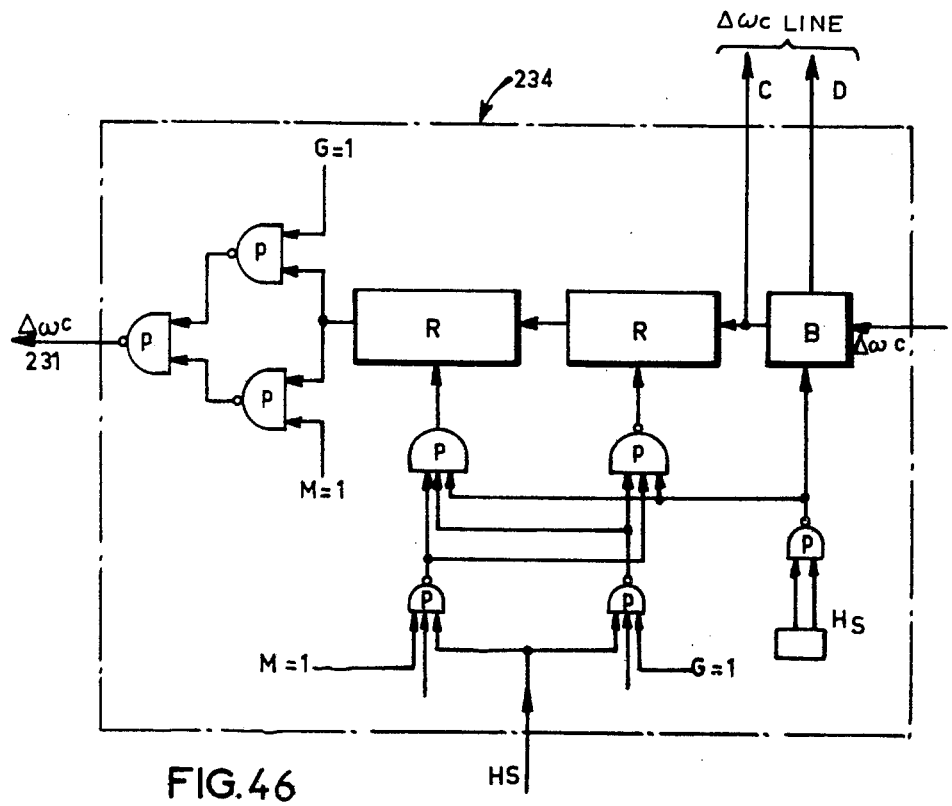
FIG. 46 is the diagram for the $\Delta\omega_C$ computing circuit.

The frequency Fo is processed by component 233, as shown in FIG. 45.

In the motor mode, the system is designed for achieving $\omega$TH in a twenty-hour velocity build-up, and Fo is determined at $\simeq$178 kHz.

However, in the case of certain periods of eclipse, the whole of the $\omega$TH curve is not described. In this case one of the two groups of component 233 (see FIG. 45) indicates at what velocity the machines must operate, while the other group indicates the $\omega$TH counting rate—'linearized' for the available sunlight time.

In the generator mode the system is intended for a maximum utilization time of 72 minutes, with a possibility of delivering a three times higher power at times, and Fo is accordingly set at $\simeq$186 kHz.

In reality Fo will be 187.5 kHz, or a quarter of 750 kHz, the pilot frequency for sequencer 206.

Figure 47:
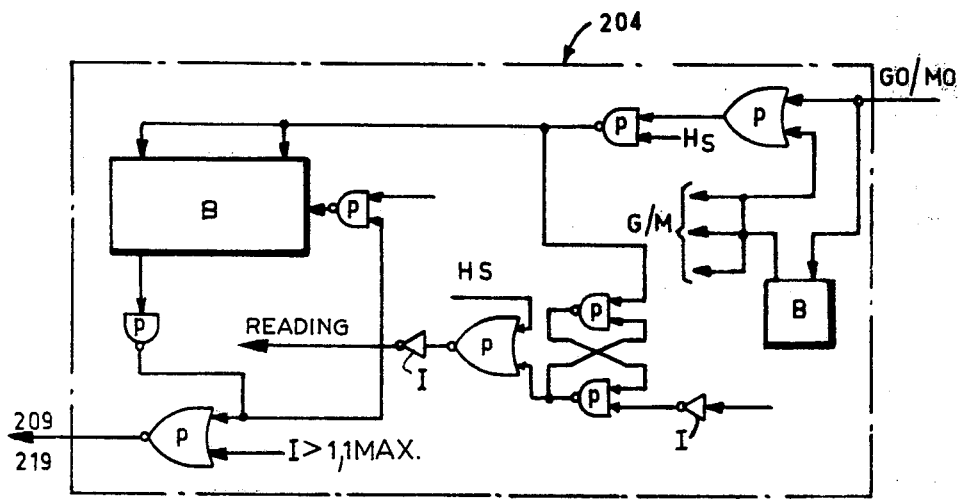
FIG. 47 is the circuit diagram for computing changeovers in operating mode.

The element 204, schematized in FIG. 47, allows changing from the generator to the motor mode.

Figure 26:
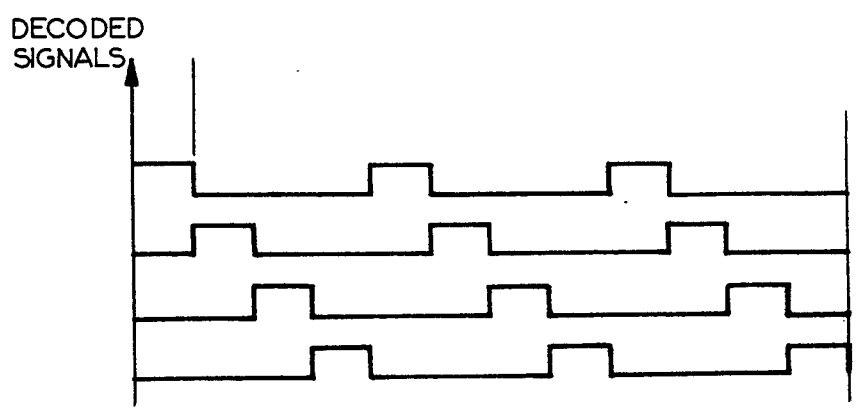
FIG. 26 is a graph portraying the shape of the switching signals subsequent to decoding.

For it is not possible to switch from the generator to the motor mode or vice versa without taking precautions, for in order to generate a +C moment for example, as shown in the graphs in FIGS. 24 and 26, then, as already stated:

$$\Delta\omega 1 = \Delta\omega 1 + \Delta\omega C \text{ in the motor mode}$$

$$\Delta\omega 1 = \Delta\omega 1 + (\Delta\omega C/2) \text{ in the generator mode}$$

The switch is consequently effected in several stages:
Detecting the switch in order to inhibit control inputs
Modifying $\omega$TH
Modifying the place of the fresh control inputs, i.e. two complete sequences
Eliminating inhibition of control inputs.

The foregoing description has revealed a possible separation of the electronics required for applying the control laws according to the main patent.

Said electronics has accordingly been divided into two main sections:
the control electronics
the processing electronics which in turn comprises:
two positioning systems, one for machine 1 and one for machine 2
a computing system.

However, an alternative self-adaptive type of processing could be substituted for the read-only memories of the control means positioning systems and for the computing system.

On the other hand, such adaptation requires the use of a microprocessor, which is not envisaged as part of the present invention.

It goes without saying that changes and substitutions may be made in the embodiments hereinbefore described without departing from the scope of the invention as set forth in the appended claims.

I claim:

1. An inertial device for regulating the on-board voltage of a spacecraft and for steering said spacecraft comprising
   at least two contra-rotating dynamo-electric machines with alternating magnetic fields and having motor and generator modes of operation,
   solar generator means to power said machines,
   power switching means connected to said machines to connect said solar generator means to said machines during said motor mode of said machines,
   velocity control means also connected to said machines during said motor mode,
   said power switching means also connected to said machines to connect an on-board electrical load of the spacecraft to said machines during said generator mode of said machines,
   and control means for determining the time of opening of said power switching means.

2. The inertial device as claimed in claim 1 wherein each of said dynamo-electric machines includes
   a rotor supported in magnetic bearings and having at least six rotating field magnets each formed by a permanent magnet with said magnets being spaced a magnetic half-pitch apart and said alternating magnetic fields being radial,
   and a stator having at least four coils in the form of turns set at a magnetic pitch and having at least one strand opposite said permanent magnets, said turns being spaced one-half magnetic pitch apart, with said strands of said turns intercepting said magnetic fields to produce upon switching of said coils,
   in said motor mode, a torque given by the relation $$\phi = BIlN^bR[1-(n/N)^2]$$

where:
B is the magnetic induction intercepting said strands,
I is the mean current flowing in each of said turns,
$\phi$ is the active length of a strand,
$N^b$ is the number of said strands,
R is the positioning radius of said strands,
n/N is the ratio of the number of commanded advance positions to the total number of possible positions;
and in said generator mode, an electromotive force E, determined by the relations:

$$E \text{ mean} = E_o \frac{\omega}{\omega_o} \left[ \frac{1}{4} + \frac{n}{N} \right] \text{ for } n \leq N/2$$

$$E \text{ mean} = E_o \frac{\omega}{\omega_o} \frac{n}{N} \left[ 2 - \frac{n}{N} \right] \text{ for } n \geq N/2$$

where:
- $n/N$ is the ratio of the number of commanded opening positions to the total possible number of positions,
- $\omega_o$ is the nominal angular velocity of the generator,
- $\omega$ is the true angular velocity of the generator, and
- $E_o$ is the no-load electromotive force of the machine at the angular velocity $\omega_o$.

3. The inertial device as claimed in claim 1 wherein said control means includes two sensors each comprising an oscillator means whose self-inductance is constituted by a ring fastened with a stator of each of said machines, metallic segments fastened with a rotor of each of said machines passing through an air gap of said rings to modify the quality factor thereof, the voltage produced being filtered and applied to a comparator which provides a logic control signal.

4. The inertial device as claimed in claim 3 wherein each metallic segment has a length of one magnetic pitch, said segments being spaced from one another by one magnetic pitch, and said rings are spaced from each other by one magnetic half-pitch.

5. The inertial device as claimed in claim 1 wherein said power switching means includes power switches each comprising firstly, high voltage transistors cascade-connected to pass the total current passing through each said switch also through each of the coils of said machine it controls, and, secondly, associated diodes which eliminate all reverse voltage at the terminals of said switch, each of said switches being controlled from voltage generators which generate a 60 V supply for application when said machines operate in said generator mode, and a 5 V supply applied during operation of said machines in said motor mode, and a supply of determinate voltage for speeding up said machines during an acquisition phase.

6. The inertial device as claimed in claim 1 wherein interconnection switches, diodes and blocking diodes are connected to said solar generator means and to the on-board electrical load of the spacecraft, said interconnection switches being conducting during operation of said machines in said generator mode, and said blocking diodes isolating said solar generator means during operation of said machines in said generator mode and isolating one of said machines from the other in the event of breakdown of one of said machines.

7. A method of regulating the onboard voltage of a spacecraft and of steering said spacecraft by an inertial device having at least two contra-rotating dynamo-electric machines operating during periods of illumination as motors powered by solar generators through power switches, and during periods of occultation as generators connected to an on-board electric load through said power switches, said method comprising the steps of:

in the motor mode of the machines,
applying switching control signals on the power switches to adjust the switching to take place in advance with respect to the nominal opening time of said switches in order to change the rotational speed of the machines;

in the generator mode of the machines,
applying switching control signals on the power switches to adjust the switching duration of said switches to maintain the on-board voltage constant notwithstanding variations in speed;

said control signals applied so as to affect the machines in such manner that,
without a steering correction,
when the speeds of the machines are equal, said speeds follow a pre-established theoretical law of speed,
when the speeds of the machines are different, said speeds vary while maintaining the speed difference imposed by the last steering correction produced by the steering device of the spacecraft, after said speed difference had previously been memorized, upon the appearance of a steering correction order,
said speeds of the machines vary both as a function of the pre-established theoretical law of speed and of the instantaneous speed difference imposed by the steering device;

and further including
obtaining the instantaneous speed difference by integrating an error signal provided by the steering device;
and controlling the pre-established theoretical law of speed by a clock having its frequency slaved to the on-board voltage when the machines operate in the generator mode.

* * * * *